United States Patent
Park et al.

(10) Patent No.: US 7,274,690 B1
(45) Date of Patent: Sep. 25, 2007

(54) AGE SELECTION SWITCHING SCHEME FOR DATA TRAFFIC IN A CROSSBAR SWITCH

(75) Inventors: Sung Soo Park, Cupertino, CA (US); Sung Man Park, Cupertino, CA (US); Jung Wook Cho, Sunnyvale, CA (US); Edward Pak, Saratoga, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 1074 days.

(21) Appl. No.: 10/302,436

(22) Filed: Nov. 22, 2002

Related U.S. Application Data

(60) Provisional application No. 60/379,577, filed on May 9, 2002.

(51) Int. Cl.
  H04L 12/50 (2006.01)
  H04L 12/56 (2006.01)
  H04Q 11/00 (2006.01)
  G06F 13/00 (2006.01)

(52) U.S. Cl. .................. 370/388; 370/395.4; 370/408; 370/412; 370/429; 710/317

(58) Field of Classification Search ................ 370/388, 370/395.4, 408, 412, 429; 710/317
See application file for complete search history.

(56) References Cited

U.S. PATENT DOCUMENTS

| | | | | |
|---|---|---|---|---|
| 5,260,935 A | * | 11/1993 | Turner | 370/394 |
| 5,339,311 A | * | 8/1994 | Turner | 370/394 |
| 5,390,173 A | * | 2/1995 | Spinney et al. | 370/393 |
| 5,414,704 A | * | 5/1995 | Spinney | 370/389 |
| 5,640,534 A | | 6/1997 | Liu et al. | |
| 5,896,380 A | * | 4/1999 | Brown et al. | 370/388 |
| 5,923,644 A | * | 7/1999 | McKeown et al. | 370/230 |
| 5,949,789 A | | 9/1999 | Davis et al. | |
| 6,081,507 A | * | 6/2000 | Chao et al. | 370/235 |
| 6,292,491 B1 | * | 9/2001 | Sharper | 370/412 |
| 6,324,164 B1 | | 11/2001 | Luijten et al. | |
| 6,370,144 B1 | * | 4/2002 | Chao et al. | 370/395.42 |
| 6,389,031 B1 | * | 5/2002 | Chao et al. | 370/412 |
| 6,487,213 B1 | | 11/2002 | Chao | |
| 6,567,417 B2 | | 5/2003 | Kalkunte et al. | |
| 6,594,270 B1 | * | 7/2003 | Drummond-Murray et al. | 370/412 |
| 6,609,222 B1 | | 8/2003 | Gupta et al. | |
| 6,625,121 B1 | | 9/2003 | Lau et al. | |
| 6,647,428 B1 | | 11/2003 | Bannai et al. | |

(Continued)

*Primary Examiner*—Alpus H. Hsu
(74) *Attorney, Agent, or Firm*—Blakely Sokoloff Taylor & Zafman

(57) ABSTRACT

A content addressable merged queue (camQ) architecture for high-speed switch fabrics reduces the memory requirement for crossbar switch input and output queues using memory cells and age tag comparators. CamQ emulates VOQ FIFO for each supporting priority, eliminating HOL blocking. Multiple QoS levels are supported cost effectively at higher traffic bandwidth limits. Content addressable memory (CAM) cells store payload destinations, which can be addressed by cell priorities. Once a priority for QoS is decided, all the cells with the selected priority in the payload can make connection requests to destination ports directly through the CAM structure. An age tag is assigned to incoming cells and fast age tag comparators provide FCFS features by selecting the oldest cell. Small memory sizes prevent the bottlenecking in ingress and egress queues. A CIOQ crossbar has a fast switching speed, emulating a FIFO output queue switch. Age and priority are interleaved to schedule switching.

41 Claims, 15 Drawing Sheets

U.S. PATENT DOCUMENTS

| | | |
|---|---|---|
| 6,674,720 B1 * | 1/2004 | Passint et al. .............. 370/235 |
| 6,747,971 B1 | 6/2004 | Hughes et al. |
| 6,816,492 B1 * | 11/2004 | Turner et al. ............... 370/394 |
| 6,856,622 B1 | 2/2005 | Calamvokis et al. |
| 6,876,653 B2 | 4/2005 | Ambe et al. |
| 6,907,041 B1 * | 6/2005 | Turner et al. ............... 370/412 |
| 6,975,638 B1 | 12/2005 | Chen et al. |
| 7,000,026 B2 | 2/2006 | Beshai et al. |
| 7,046,687 B1 | 5/2006 | Brown et al. |
| 7,092,390 B2 | 8/2006 | Wan |
| 2002/0085567 A1 | 7/2002 | Ed et al. |
| 2004/0030766 A1 | 2/2004 | Witkowski |
| 2006/0007871 A1 | 1/2006 | Welin |

* cited by examiner

Phase Cell Structure for three step self adjustment
(11 --> 10 --> 00 --> Invalidate)

610  Phase[1]

620  Phase[0]

AGE SELECTION SWITCHING SCHEME FOR DATA TRAFFIC IN A CROSSBAR SWITCH

RELATED UNITED STATES APPLICATION

This utility application claims priority to now abandoned U.S. Provisional Patent Application Ser. No. 60/379,577, entitled "A Content Addressable Merged Queue Architecture for Single Chip High Speed Switch Fabric Solution," with filing date May 9, 2002, by Sung Soo Park, et al., and assigned to the assignee of the present application.

TECHNICAL FIELD

Embodiments of the present invention relate to the field of data switching. More specifically, embodiments of the present invention relate to high speed packet based switching in a crossbar switch.

BACKGROUND ART

Recent applications of packet based IP switching technology have extended to many areas, such as mobile infrastructure, Multi-Service Provisioning Platform (MSPP), high-speed Internet routers, Storage Area Network (SAN) equipment, and high-definition television. The current demand for higher bandwidth across the global network is driving a need for higher performance and higher port counts in "next generation" switching solutions.

Many of these high-speed switches are built around a crossbar architecture because of its speed and simplicity. Due to switching speed limitations, crossbar based architectures typically use input queues to hold packets or cells waiting to be transferred. A typical switching scheme applies the well known first in/first out (FIFO) regime to prioritizing the transfers from these queues. However, such simple FIFO input queues inherently suffer diminished performance because of head of line (HOL) blocking.

HOL blocking can be eliminated by applying a virtual output queue (VOQ) FIFO structure, but this poses strenuous demands on memory size. One such demand is that a VOQ FIFO architecture requires a memory size to grow according to the square of the number of port increases. Another such memory demand is presented by the per-flow queuing for quality of service (QOS).

The provision of QOS demanded by modern, advanced-architecture network systems requires the isolation of specific traffic flows among multiple flows, and each specific flow needs to have its own behavior characteristics and service level. A prerequisite for such isolation typically requires separate FIFO implementation for each flow. Together, the need for separate VOQ FIFOs for each QOS priority can drive a switch fabric solution to hundreds of chips. Therefore, providing enough memory within the switching function becomes a costly bottleneck for next generation switch fabric chip set vendors.

This can be illustrated by the following example. For a 32-port switch fabric with 32 priorities, 1024 FIFOs (32 destinations times 32 priorities) are required per port for per-flow QOS support and for elimination of HOL blocking. If the fixed cell size of 64 bytes is used and the cell depth of each VOQ is 64, then the overall memory requirement for the switch fabric system is 128 Mbytes (1024 VOQs times 64 cells per queue times 64 bytes per cell times 32 ports).

This huge memory size would be extraordinarily difficult and expensive, and perhaps impossible with contemporary processing technologies, to integrate into a cost effective, single chip solution. Thus, another approach should be taken to achieve small die size but without sacrificing performance. Examining actual internet traffic indicates that average usage of this huge input buffer can be as low as less than 2% at 99% full input traffic rates. This low actual memory utilization rate offers opportunity for a different approach. However, taking advantage of the low actual memory utilization rate is problematic using conventional crossbar architectures.

Conventional crossbar architectures utilize separated queues for the detection and scheduling of cell transfer. This is problematic because of the large capacity, speed, and addressibility demands made on memory resources and/or the large memory size such an approach requires, as discussed above. Further, even conventional crossbar switch architectures made with memories of capacity and addressability sufficiently large to accommodate such demands can pose other complicating problems.

Even for conventional crossbar switch architectures made with memories of capacity and addressability sufficiently large to accommodate the demands of detection and scheduling of cell transfer, implementing a FIFO regime thereon requires a pointer functionality to nominate and designate cells for transfer. The pointer functionality requires a pointer as well as a management system and/or process for its control. Implementing a FIFO regime with a large memory in a crossbar switch demands a complex pointer management system, which is difficult and expensive to implement in conventional technology.

A further problem with conventionally implementing crossbar switch architectures made with memories of capacity and addressability sufficiently large to accommodate the demands of detection and scheduling of cell transfer is that of retarded speed. The switching speeds of such conventional crossbar switch architectures are constrained by the addressibility and size of the memory they field.

The conventional art is problematic therefore because memories of sufficient capacity and addressability for implementing a FIFO switching function in a crossbar switch using conventional architectures therefore are difficult and expensive to achieve, especially to support more than one QoS level, and in a single integrated circuit (IC; e.g., chip). The conventional art is also problematic because even if an adequate memory is achieved, the FIFO switching function of such a crossbar switch requires a complex pointer management system. Further, the conventional art is problematic because crossbar switches so constructed may operate at less than optimal switching speeds and bandwidths.

SUMMARY OF THE INVENTION

What is needed is a system and/or method for emulating a FIFO switching function in a single chip crossbar switch architecture that operates at a high switching speed with a large bandwidth and supports multiple QoS levels, yet does not demand an inordinately large number of input and output queues or otherwise excessively tax memory requirements. What is also needed is a system and/or method for emulating a FIFO switching function in a single chip crossbar switch architecture that operates at a high switching speed with a large bandwidth and supports multiple QoS levels that does not require a complex pointer management system. What is further needed is a system and/or method for emulating a FIFO switching function in a single chip crossbar switch architecture that achieves the foregoing without constraining switching speeds and bandwidth capacity therein.

A system and method for an age selection switching scheme for data traffic in a crossbar switch is disclosed in one embodiment herein that emulate a FIFO switching function in a single chip crossbar switch architecture that operates at a high switching speed with a large bandwidth and supports multiple QoS levels, yet do not demand an inordinately large number of input and output queues or otherwise excessively tax memory requirements. A system and method are also disclosed in one embodiment herein that emulate a FIFO switching function in a single chip crossbar switch architecture that operates at a high switching speed with a large bandwidth and supports multiple QoS levels, yet do not require a complex pointer management system. A system and method are further disclosed in one embodiment herein for emulating a FIFO switching function in a single chip crossbar switch architecture that achieves the foregoing without constraining switching speeds and bandwidth capacity therein.

A content addressable merged queue (camQ) architecture for high-speed switch fabric solutions is disclosed. The architecture reduces the memory requirement for input and output queues for crossbar switches significantly by the use of special content addressable merged (CAM) memory cells and age tag comparators. These are implemented within a single chip. In one embodiment, camQ behaves functionally like VOQ FIFO for each supporting priority. Thus, camQ eliminates HOL blocking. In one embodiment, camQ also embraces a scheduler and crossbar within the chip, supporting TDM traffic and multicast traffic also. In one embodiment, structure is independent of the number of support priorities. In one embodiment, many QoS levels are provided, while remaining cost effective at higher traffic bandwidth limits.

Unlike conventional separated queues for the detection and scheduling of cell transfer, camQ architecture is comprised of small payload static random access memory (SRAM), Content Addressable Memory (CAM) for priorities and destinations of the cells in the payload SRAM, and age tag comparators. CAM cells store payload destinations for cells, which can be addressed by cell priorities. Once a priority for the quality of service is decided, all the cells with the selected priority in the payload can make their connection requests to the destination ports directly through the CAM structure. This avoids HOL blocking by the cells ahead whose destination was blocked for some reason.

The VOQ First-Come-First-Serve (FCFS) function is supported without the conventionally required complex pointer management system for FIFO. Instead, in one embodiment, camQ assigns an age tag to each incoming cell. Fast age tag comparators then effectuate the FCFS feature of switch fabric by selecting the oldest cell.

Returning to the above example of 32 ports and 32 priorities, the total memory capacity using the camQ approach of one embodiment requires only 64 Kbyte payload SRAM (32 input ports times 32 depth/ports times 64 byte cell size) for its 32 input buffers. The small sizes for CAM memory and comparators advantageously prevent the conventionally common bottlenecking of data in ingress and egress queues, facilitating single chip integration.

Further, the small size on-chip input queues yield the added benefit of increased switching speed. In one embodiment, camQ architecture is implemented to schedule at twice the rate of the line speed. This effectuates a combined input and output queued (CIOQ) crossbar architecture. In one embodiment, an N×N CIOQ has a switching speed of 2−(1/N), and thus emulates an N×N FIFO output queue switch.

In one embodiment, an age comparison system compares the relative ages of data cells to be switched. The age comparison system compares the ages and selects data cells for switching based on their age, such that older cells are selected for switching prior to younger data cells. A phase correction function adjusts the ages of aging data cells and automatically deletes stale data by eliminating cells that have not been switched and that are beyond a certain maximum age.

In one embodiment, a method for scheduling data cells for switching interleaves the relative ages of data cells with their relative priorities. In one embodiment, an interleaved age-priority switching vector is generated. In one embodiment, the interleaved age-priority vector has a dynamically reconfigurable bit order, to accommodate service updates. In one embodiment, an age comparison scheme prioritizes data cells for export after switching according to their relative ages.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

A content addressable merged queue (camQ) architecture for high-speed switch fabric solutions having an age selection switching scheme for data traffic is disclosed. In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed by electronic systems. These descriptions and representations are used by those skilled in the electronic arts to most effectively convey the substance of their work to others skilled in the art. A procedure, system executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical signals capable of being stored, transferred, combined, compared, and otherwise manipulated in an electronic system. It has proven convenient at times, principally for reasons of common usage, to refer to these signals as bits, values, elements, symbols, characters, terms, numbers, or the like.

Figure 1:
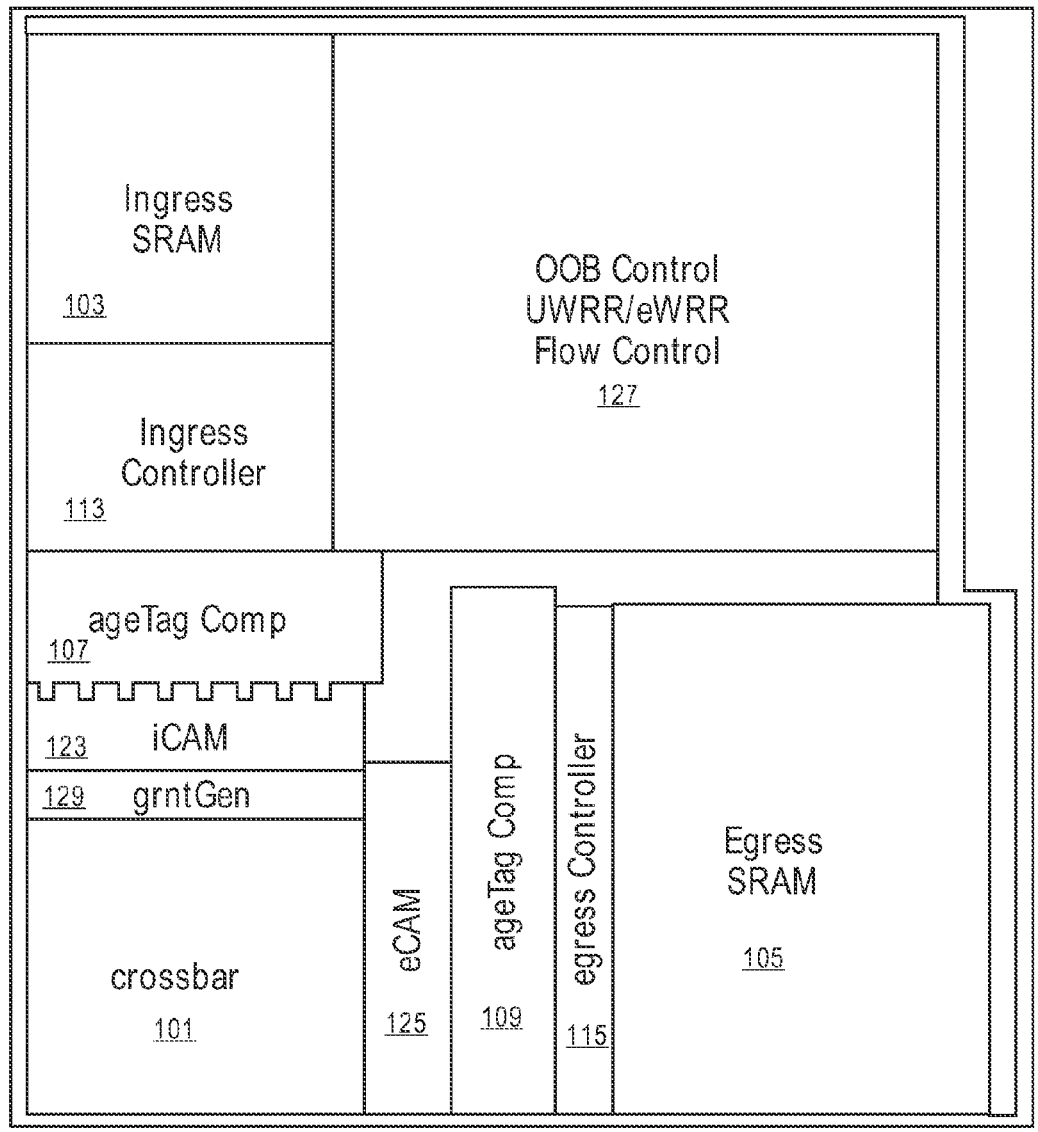
FIG. 1 is a block diagram of an 8-port quadrant of an exemplary 32-port crossbar switch featuring a camQ architecture, in accordance with one embodiment of the present invention.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "ascertaining," "comparing," "determining," "storing," "receiving," "increasing," "combining," "re-combining," "correcting," "controlling," "eliminating," "inverting," "reading," "prioritizing," "writing," "re-writing," "generating," "latching," "performing," "multiplexing," "queuing," "interleaving," "listing," "launching," "switching," or the like, refer to the action and processes of an electronic system (e.g., system 100; FIG. 1), or similar electronic system, that manipulates and transforms data represented as physical, e.g., electrical quantities within the systems' queues, registers, and memories into other data similarly represented as physical quantities within the systems' queues, memories, or registers or other such information storage, transmission, or display devices.

Figure 12:
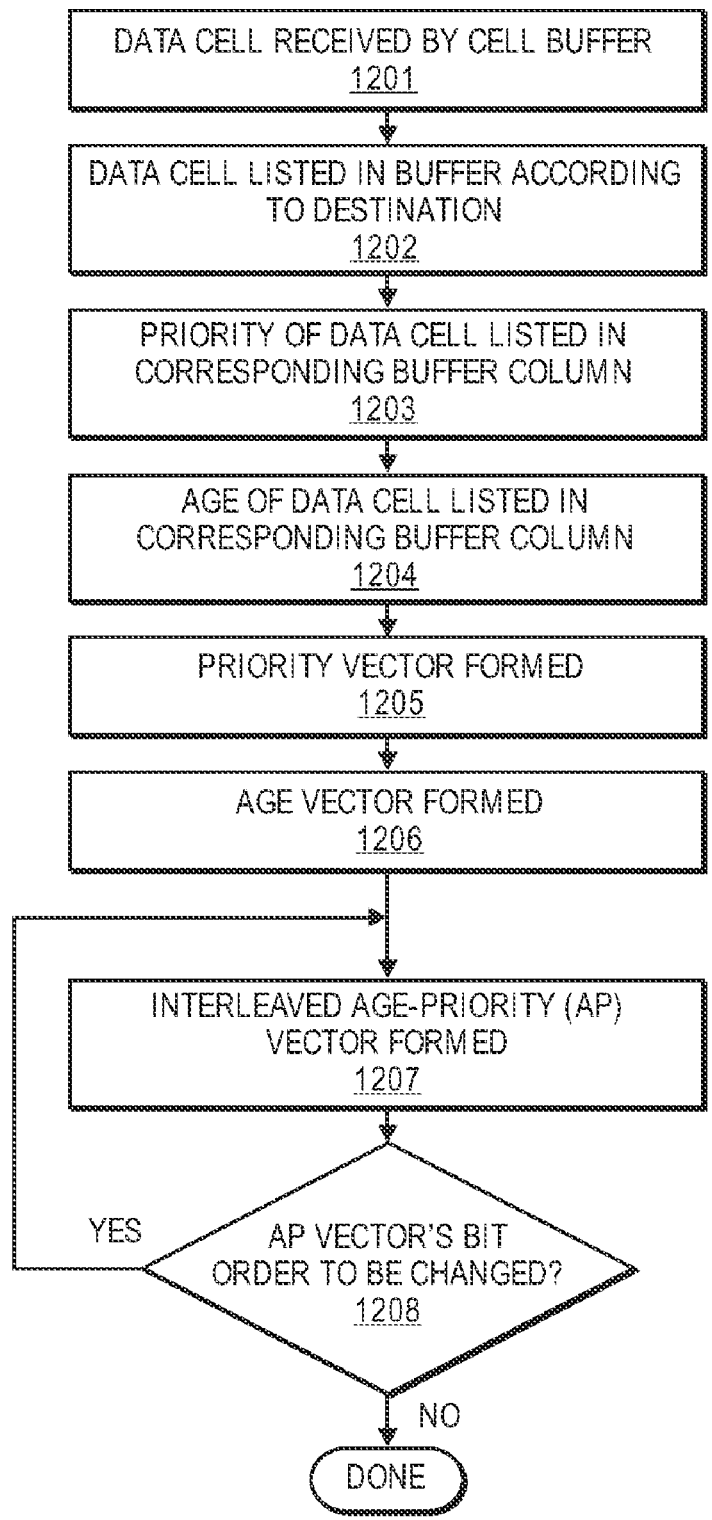
FIG. 12 is a flowchart of the steps in a method for interleaving data cell age and priority to schedule switching, in accordance with one embodiment of the present invention.

Further, embodiments of the present invention may be discussed in terms of computer processes. For example, FIG. 12 depicts process 1200, performed in accordance with embodiments of the present invention for age comparison. Although specific steps are disclosed in FIG. 12 describing the operations of these processes, such steps are exemplary. That is, embodiments of the present invention are well suited to performing various other steps or variations of the steps recited in the flowchart herein.

Exemplary Crossbar Switch Platform Deploying CamQ Architecture

FIG. 1 depicts an 8-port quadrant 100 of an exemplary 32-port crossbar switch featuring a camQ architecture, in accordance with one embodiment of the present invention. Quadrant 100 exemplifies a content addressable merged queue (camQ) architecture for high-speed switch fabric solutions. This architecture reduces the capacity, which would otherwise be required for input and output queues for crossbar switches significantly. This reduction in memory requirements is effectuated by the use of small payload SRAM in ingress SRAM (iSRAM) 103 and egress SRAM (eSRAM) 105, and special content addressable merged (CAM) memory cells for priorities and destinations of the cells in the payload SRAM (e.g., iSRAM 103 and eSRAM 105), as well as by deployment of age tag comparators 107 and 109. The CAM cells are deployed in ingress CAM (iCAM) 123 and egress CAM (eCAM) 125.

The CAM cells in the iCAM 123 and eCAM 125 store the payload destinations of cells, which can be addressed by cell priorities. Once a priority for the quality of service is decided, all the cells with the selected priority in the payload can make their connection requests to the destination ports directly through iCAM 123 and eCAM 125. Advantageously, this avoids HOL blocking by the cells ahead whose destination was blocked for some reason. Ingress age tag comparator 107 assigns an age tag to each incoming cell. Egress age tag comparator 109 selects the oldest cell and assigns it an age urgency. Age tag comparators 107 and 109 thus effectuate a FCFS feature for the crossbar switch fabric 101.

Traffic through crossbar component 101 is controlled in one embodiment by a dual age-priority (AP) switching process (e.g., process 1200; FIG. 12). Traffic into ingress SRAM 103 is controlled by ingress controller 113. Traffic for export via egress SRAM 105 is controlled by an egress controller 115. An urgency based weighted round robin (UWRR) flow controller 127 handles connection requests and correspondingly schedules and controls fabric traffic, based in part on the age urgency assigned by egress age comparator 109. Cells are granted connection by grant generator 129.

In one embodiment, the camQ architecture 100 switches at a speed that is twice that of the line speed, thus effectuating a combined input and output queued (CIOQ) crossbar architecture. In the present embodiment, the 32×32 CIOQ camQ architecture 100 with its switching speed of 2−(1/32) emulates a 32×32 FIFO output queue switch. In one embodiment, timing sequences characterizing the operation of camQ architecture 100 help to effectuate this and other features.

Exemplary Operational Clocking and Priority Selection

Exemplary Clocking

Figure 2:
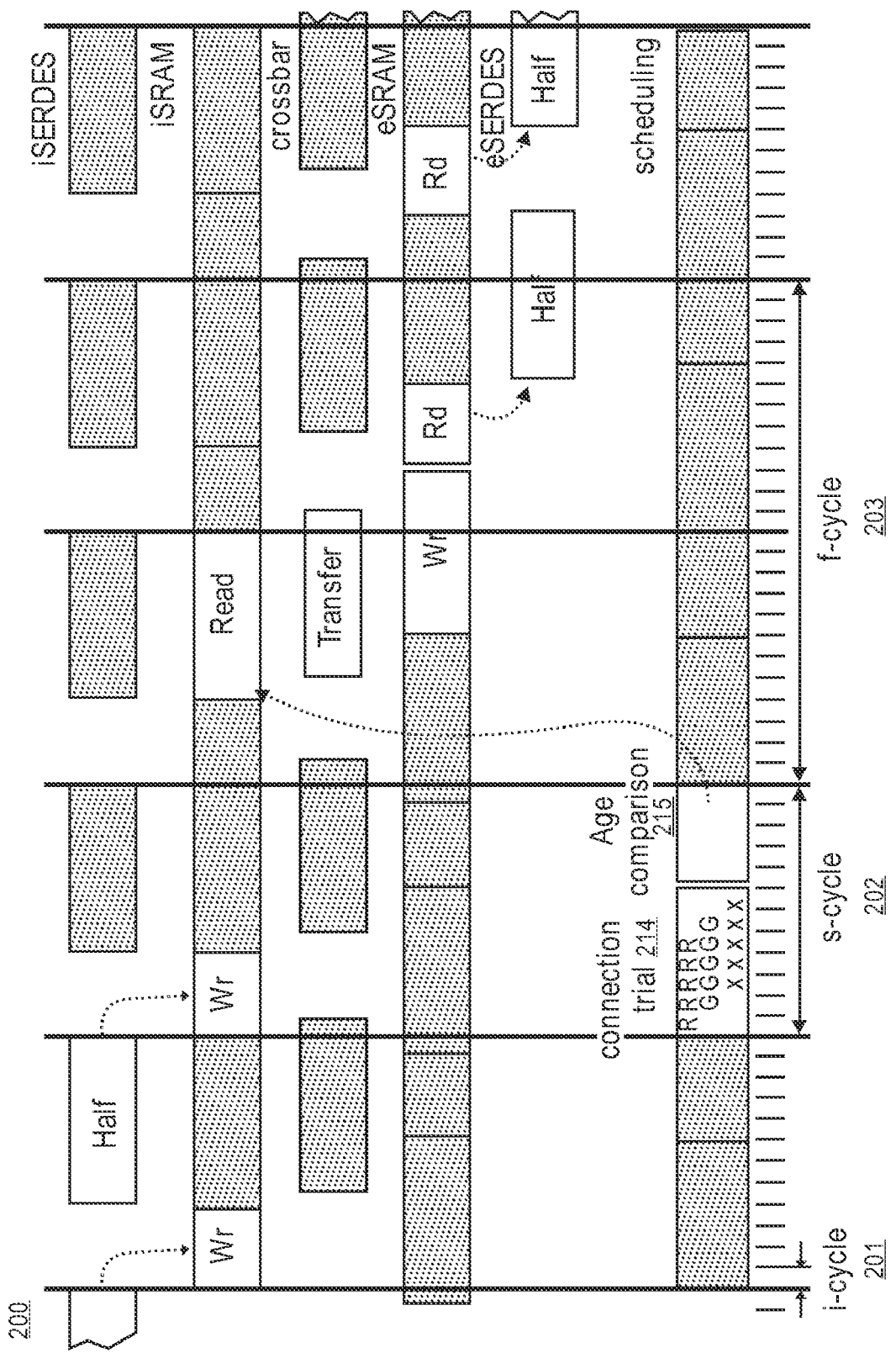
FIG. 2 depicts a clock relationship by which a camQ switching functionality operates, in accordance with one embodiment of the present invention.

With reference to FIG. 2, a timing sequence 200 depicts the sequence of operation of a camQ architecture, according to one embodiment of the present invention. In the present embodiment, three different clock cycle speeds are operational. These include the i-cycle 201, the s-cycle 202, and the f-cycle 203. Incoming cells are synchronized to f-cycle 203 at the rate of one cell per f-cycle 203. Considering overheads, such as 8b10b encoding, cell boundary synchronization, and cell header information (including cell ID, in-band flow control, cell priority and destination), approximately 15

Gbps of serial link bandwidth is required for an actual 10 Gbps of payload traffic in an OC-192 data rate. In the present embodiment, internal data parallelism and high-speed 500 MHz internal clocking effectuate 64-byte cell framing at the 20 MHz rate of f-cycle 203.

Transferal of cells to an output queue is based on s-cycle 202. In the present embodiment, s-cycle 202 operates at twice the speed of f-cycle 203. Thus, two cells can be transferred through the crossbar (e.g., crossbar 100; FIG. 1) per one f-cycle 203. The effective internal payload switching bandwidth of the crossbar is thus 20 Gbps per port. In as much as the entire cell reading and transferring are done at on-chip SRAM (e.g., iSRAM 103, eSRAM 105; FIG. 1), the 20 Gbps internal bandwidth is supported (64 bit read per 2 nsec equals 32 Gbps).

During one s-cycle 202, there are five connection trials 214 to output queues based on the fastest clock, which is i-cycle 201. When a cell successfully gets connection to its destination, there follows an age tag comparison 215 for the selection of the oldest cell with the destination. All of the connection trials 214 and age comparisons 215 are completed within a single s-cycle 202.

In one embodiment, connection trials are repeated where previous trials did not succeed until successful. In one embodiment connection trials are repeated until successful, or until up to five connection trials have been unsuccessfully completed in an s-cycle 202. In another embodiment, connection trials are repeated until successful, or until some other number of connection trials have been unsuccessfully completed in an s-cycle 202. Each subsequent connection trial is run for egress ports, which have not been connected for the cell transfer. Thus, the probability for connection trial success is smaller than for earlier trials. In one embodiment, the success rate for connection trails can approximate 77% at the first trial with 100% traffic loading of bernoulli_i-id_uniform input, while only 1.4% of the connections may succeed at the fifth trial with the same condition. In one embodiment, extending connection trials beyond five, with even lower probabilities of successful connection (and significance), are forgone. Advantageously, this conserves resources. In another embodiment, more than five connection trials can be performed in an s-cycle 202.

During the connection trial, the priority level of the cells is decided. Connection requests are generated accordingly and made to a grant generator (e.g., grant generator 129; FIG. 1, 3A). One embodiment achieves the advantage of higher performance with a weighted round robin (WRR) based priority selection, a process known in the art. In another embodiment, other selection schemes are used, such as strict priority based selection. Conventional WRR based priority selection algorithms would give to each cell the same chance of selection if the accumulated weight is greater than certain one criterion, a term known in the art. The WRR based priority selection process employed by an embodiment of the present invention however applies additional criteria in its selection process, e.g., the number of different available trial slots and the urgency level associated therewith.

Urgency Based Priority Selection

In the present embodiment, e.g., five different trial slots each have different success probabilities. Thus, the present embodiment assigns multiple urgency levels for WRR selection criteria. This urgency based WRR (UWRR) works with five different levels of selection criteria, called urgency levels. At each of the five connection trials, the trial will be made only for the priorities that have higher urgency level than a pre-determined urgency value of that trial slot. The higher the urgency level, the earlier its corresponding connection trial will be made.

Each of 32 priority levels will be mapped to these urgency levels with a different initial urgency. As a pre-determined period passes by without any connection success, the corresponding urgency increases. The priority selection for the connection trial is done by Round-Robin manner among the priorities with the same urgency level. Unlike conventional WRR, UWRR does not make any connection request even if it has a cell with higher priority. In return, advantageously, this lack of a request (e.g., forestalling on generating one) effectively guarantees higher connection success rates for more urgent requests from other ports. One embodiment operates in a time division multiplexing (TDM) support mode. In the TDM support mode, TDM cells use the first connection request stage, virtually assuring that the connection will succeed for that TDM cell.

Output Buffer Considerations

Even if cells can be sent to their egress destinations two times faster than its line speed within a chip, it is not easy conventionally for the switch fabric chip to send the egress cells to the outside world at that higher rate. Usually, the line speed is limited by the serializer-deserializer (SERDES) performance, and both ingress and egress SERDES circuits work at the same speed. The Traffic Manager or NPU may not be able to handle two times faster traffic input either, by its lack of processing capability. If there is temporary over-subscription to a certain destination, the egress cells begin to stay at the output buffer. Embodiments of the present invention however, effectuate handling switching traffic at twice line speed.

One embodiment treats the egress traffic bandwidth to be the same as ingress traffic bandwidth. The present embodiment implements simple output buffers, because there is no need for connection scheduling there. These output buffers thus accord an advantageous place for implementing QOS control in the present embodiment. Whereas conventionally, separated priority FIFOs in output queue buffers implement QOS control, the present embodiment uses the same priority CAM and age tag comparison structure to maximize the output buffer usage. No destination field exists in the egress CAM. The QOS cell selection at the output buffer is scheduled with relative ease. Priority for launching cells is assigned by simple WRR. This assigned priority is given to the CAM and the age tag comparator. The CAM and age tag comparator then decide a specific corresponding cell with that priority.

In the present embodiment, the output queue is implemented on the order of four times deeper, relative to conventional art. Burst destined traffic is thus handled expeditiously in the output queue. Further flooding of cells to a certain egress buffer causes "back-pressure" to the ingress side traffic managers. This back-pressure stops further cells from being sent to the specific destination port. Further, the presence of this back-pressure is broadcast to other ingress traffic managers by an egress cell header. The present embodiment thus effectuates in-band "per-destination" flow control.

Exemplary Performance Model

With the camQ architecture as an input queue, one embodiment of the present invention displays properties including average cell latency per priority, buffer overflow, and jitter that are superior to conventional VOQ FIFO performance. In the following discussion, modeling the performance of switching architecture is achieved by ignoring the latency of SERDES circuits.

To compare the performance of a 32 depth camQ structure (e.g., camQ structure 100; FIG. 1) with a conventional VOQ FIFO structure, a 64 depth conventional VOQ FIFO using an ingress serial line internet protocol (iSLIP) as a VOQ scheduling algorithm with the iteration number of 2 per each priority (total 8 iterations for 4 priorities) is also modeled. The iSLIP with 32 priorities yields an unrealistic 64 iterations. Thus, for the present comparison, only four priorities are assumed for the conventional iSLIP model.

One dichotomy becomes readily apparent in comparing the memory requirements of the present embodiment with that of the conventional model. For instance, the resulting conventional VOQ input buffer size is 512 Kbyte per port. For a conventional VOQ function supporting 32 priorities, 4.0 Mbyte of memory is demanded per port. In comparison, a 32-depth camQ architecture according to the present embodiment requires only 2 Kbyte per port, an advantageous saving of 2,000:1 over the conventional art.

Further comparative results between the camQ architecture of the present embodiment and a conventional VOQ FIFO architecture, including latency, overflow, and buffer usage at a mean length of 20 of bursty traffic, and with a loading of 99 percent (terms known in the art) are summarized in Table 1 below. For modeling of the present embodiment so as to observe camQ performance as an input queue, no back-pressure is assumed from the output buffer on either the conventional VOQ or the camQ architecture.

TABLE 1

COMPARISON OF LATENCY, OVERFLOW AND BUFFER USAGE BETWEEN CAMQ OF THE PRESENT EMBODIMENT AND CONVENTIONAL VOQ-FIFO

|  |  | CAMQ | VOQ FIFO (conventional) |
|---|---|---|---|
| Latency | Priority 0 | 1(1) | 8(32) |
| (Jitter) | Priority 3 | 1(2) | 2036(3953) |
| in | Priority 15 | 2.6(5) | Not Available |
| cells | Priority 31 | 13.2(16) | Not Available |
| Average Overflow | | 1.5% | 4.2% |
| Average Occupancy | | 3.33 cells/32 depth | 457 cells/8192 depth |

Latency is significantly smaller for the camQ architecture of the present embodiment for both high and low priorities, and the conventional VOQ FIFO architecture actually fails to perform the actual switching service at low priorities. Although lower priorities are handled with greater latency in the present embodiment than are higher priorities, even the relatively low priority of 15 has less latency in the camQ of the present embodiment than the latency of the conventional VOQ FIFO highest priority of 0. Again, the conventional VOQ FIFO fails to even switch priority 15 at all. Further, the lowest priority of 31 (which again, the conventional VOQ FIFO fails to even switch), has a latency in the camQ of the present embodiment that is over two orders of magnitude smaller than the latency of the relatively high priority 3 in the conventional VOQ FIFO (and on the order of the latency with which the conventional art handles its highest priority).

As the priority level drops, the latency and jitter increase can be observed for the camQ architecture, as well. In the present embodiment, this increased latency and jitter for lower priority levels result from the UWRR priority selection process for QoS, described above.

Another significant advantage of the present embodiment is less buffer overflow than is typical in conventional VOQ FIFO. For instance, the camQ architecture of the present embodiment shows no buffer overflow at Bernoulli traffic and 1.5% of buffer overflow at bursty traffic (terms known in the art). The conventional VOQ FIFO, on the other hand, shows about 4.2% of buffer overflow on both Bernoulli and bursty traffic.

The present embodiment also has the advantage of lower average occupancy per port than the conventional VOQ FIFO. The average camQ occupancy per port is also shown. In another embodiment, further reduction of input queue depth is achieved where there is no queue underflow due to SERDES communication latency.

Where an egress SERDES or an egress traffic manager cannot consume all the cells coming into an output buffer, output queue depth has stronger impact on buffer overflow than does the input queue depth. This realistic switch fabric performance is modeled with single chip camQ architecture according to one embodiment, showing the result of buffer overflow and latency assuming the same ingress and egress line speed. The traffic model characterizes performance of the present embodiment that was applied above; 99% loading of bursty traffic with the mean length of 20. The output queue depth is 128. In this model, it is assumed that a small linked list cell buffer in a separate ingress traffic manager chip serves as the "per-destination" flow control. A 128 (8 KB) buffer depth in the traffic manager is also assumed. The performance of the present embodiment under these parameters is summarized in Table 2, below. This performance can also be compared with the conventional VOQ FIFO (summarized above in the corresponding column of Table 1).

TABLE 2

CAMQ LATENCY AND BUFFER OVERFLOW WITH FLOW CONTROL WITH OUTPUT QUEUE ENABLED

| Latency | Priority 0 | 1.98 |
|---|---|---|
| in | Priority 3 | 20.5 |
| Cells | Priority 15 | 95 |
|  | Priority 31 | 628 |
| Buffer Overflow | | 2.62% |
| Input Buffer Occupancy | | 4.5/32 depth |
| Output Buffer Occupancy | | 73/128 depth |

Table 2 shows that the camQ architecture of the present embodiment provides performance superior to conventional VOQ FIFO in terms of buffer overflow and latency. The average output buffer occupancy is higher than input buffer occupancy. Thus, the camQ architecture of the present embodiment emulates an ideal characteristic of output queue switching.

Figure 3:
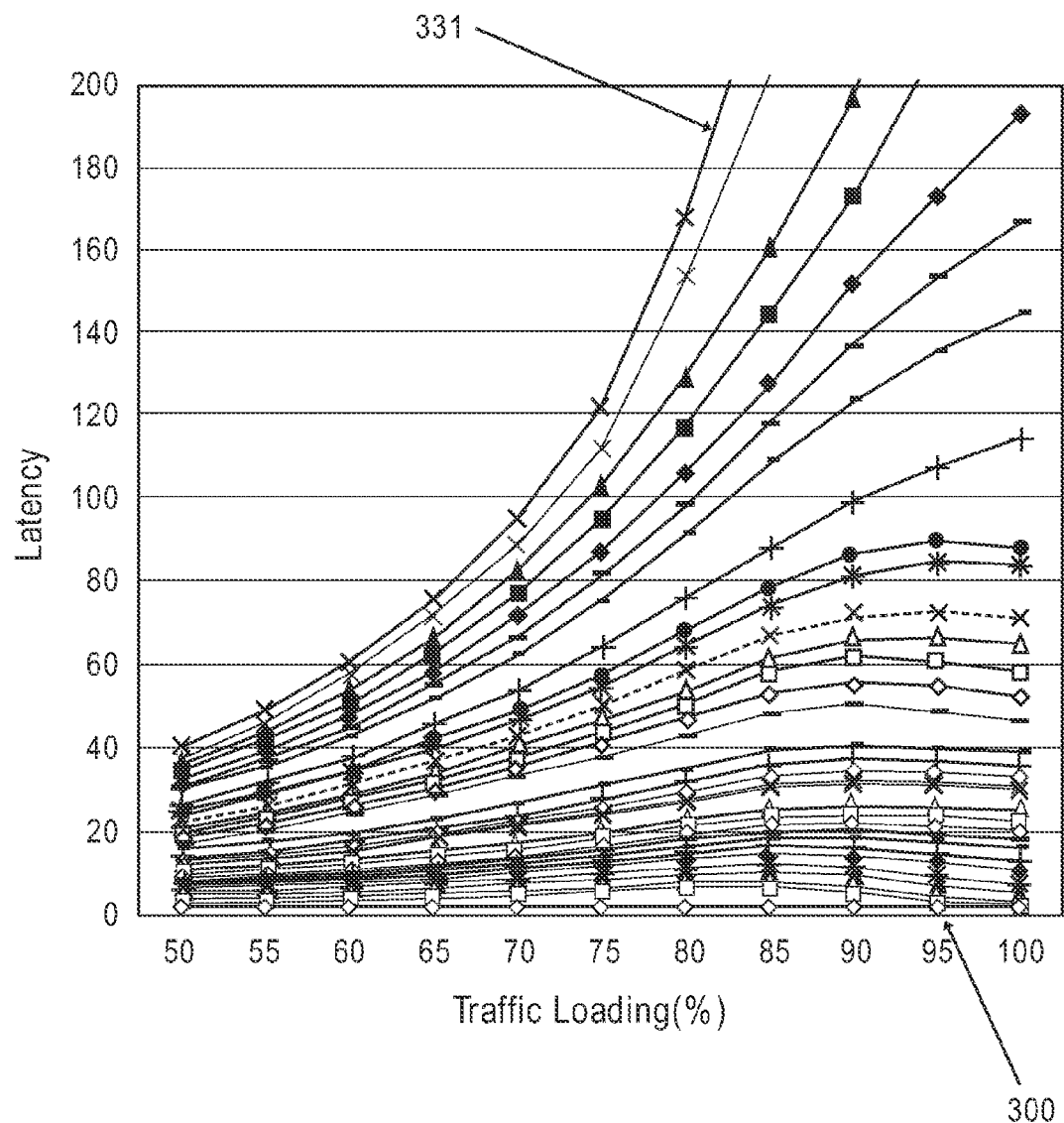
FIG. 3 depicts a graphical representation of overall latency for priorities as a function of traffic loading, in accordance with one embodiment of the present invention.

With reference to FIG. 3, the overall latency of each of the 32 priorities of the present embodiment is plotted as a function of traffic loading. The QoS characteristic of the present embodiment with different traffic loading in bursty traffic is shown. The bottom plot 300 is for priority 0 and the top plot 331 is for priority 31. Plots between plot 300 and plot 331 are not labeled, so as to keep the figure uncluttered (they could however accordingly be numbered 301 through 330, respectively). This well-distributed latency pattern shows that the camQ architecture of the present embodiment emulates ideal QoS.

Priority and Destination CAM and Connection Grant Generator

Figure 4A:
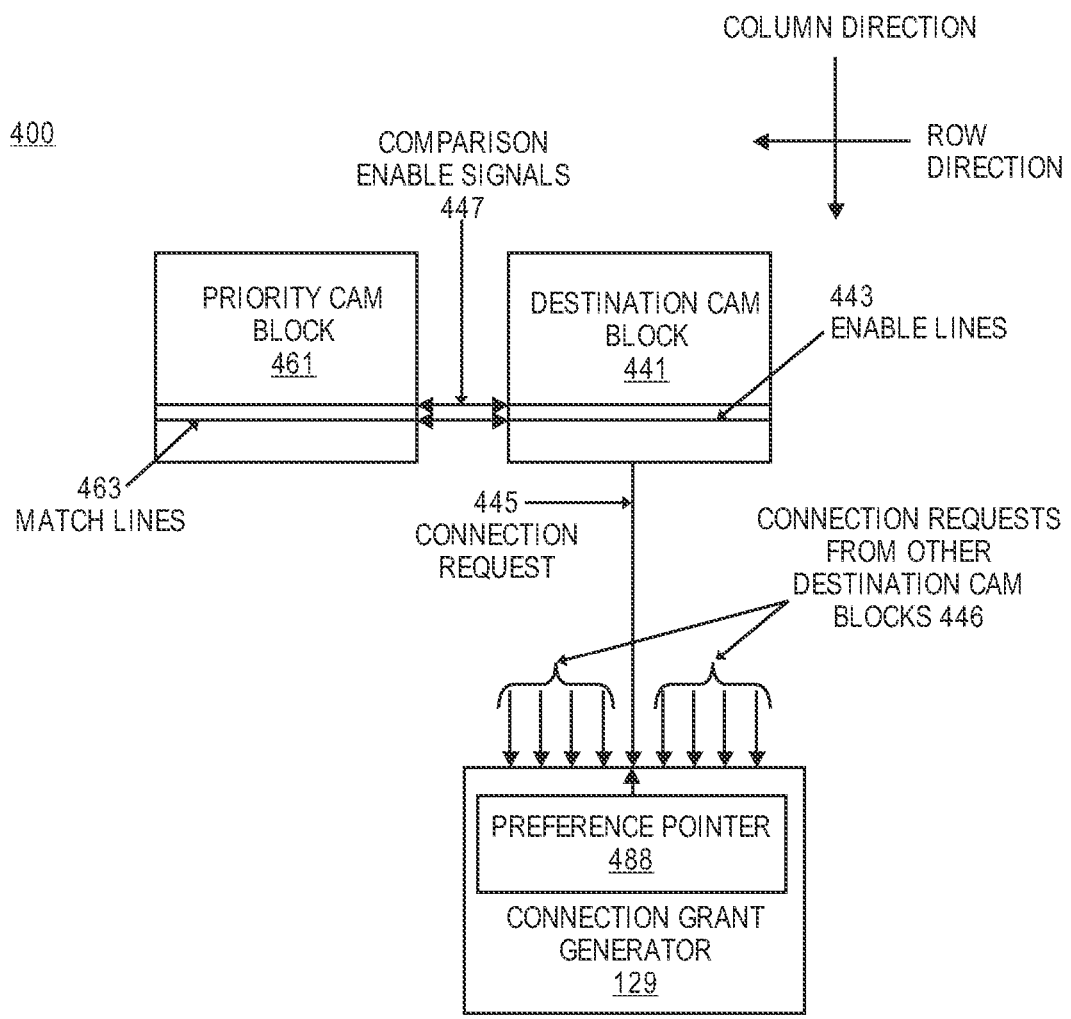
FIG. 4A depicts a CAM cell structure for cell priority and destination, in accordance with one embodiment of the present invention.

FIG. 4A depicts a CAM 300 for cell priority and destination. CAM 400 has two blocks. Block 461 services cell destination. Destination block 461 has two enable lines 463. Block 441 services cell priority. Priority block 441 has two match lines 443. Match lines 443 are interconnected with enable lines 463. Destination block 461 generates comparison enable signals 447 in its row direction. Destination block 461 also generates connection requests 445 in its column direction. The connection request 445 is handled by connection grant generator 129, which also handles connection requests 446, made by other destination CAM blocks (not shown), when its preference pointer 488 selects them.

In one embodiment, connection grant generator 129 generates connection grants to incoming connection requests (e.g., connection requests 445, 446) randomly selected based on its preference pointer 488. The preference selected by preference pointer 488 changes at every cell transfer. This changing preference upon each cell transfer effectuates desynchronization between destination ports. In one embodiment, the preference pointer is set to point at a specific ingress point, via a particular destination CAM block (e.g., destination CAM block 441). Pointing at a specific ingress port supports multiple egress connections from that source port. This helps to effectuate multicast cell transfer.

Figure 4B:
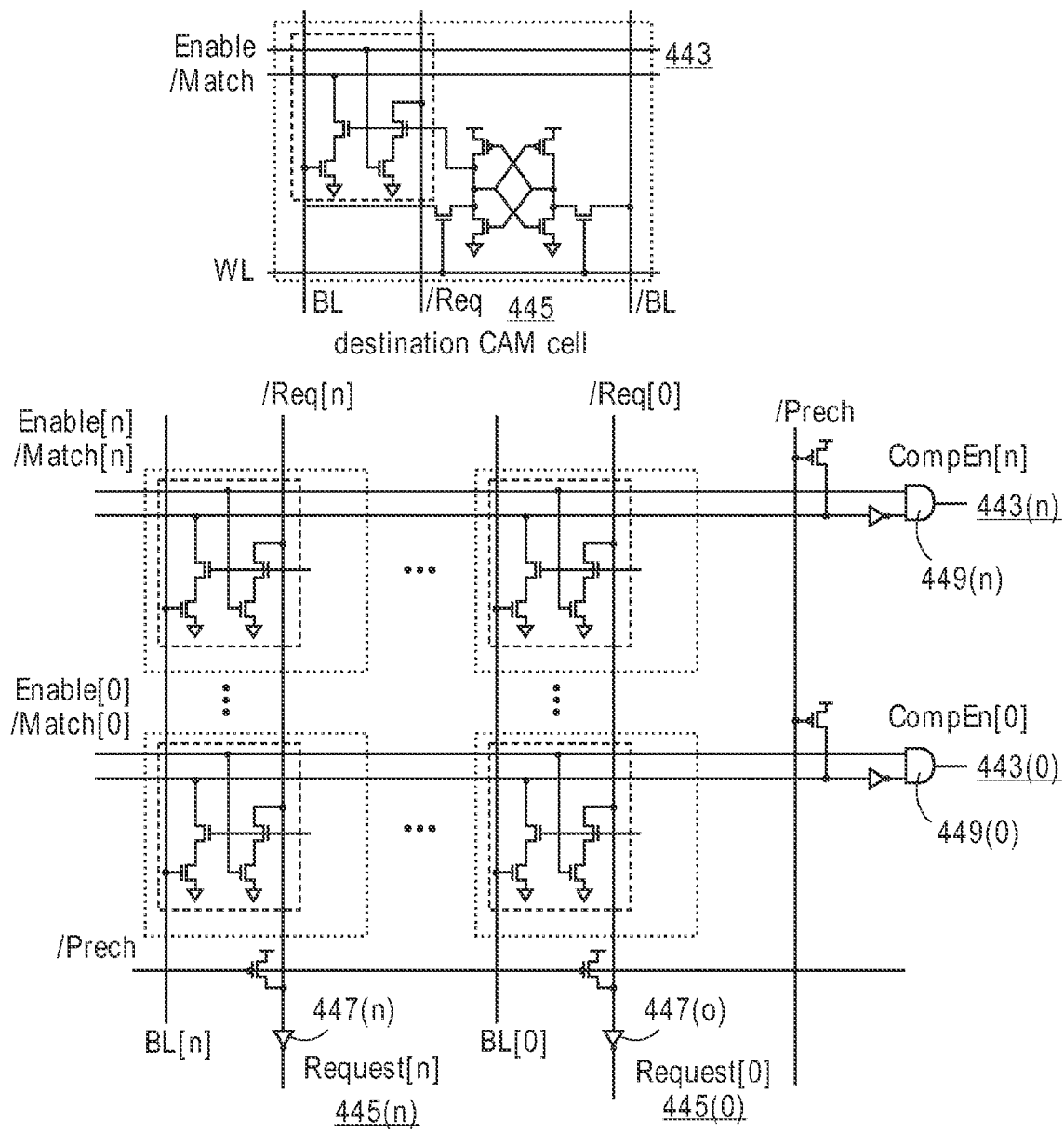
FIG. 4B depicts a destination CAM block of FIG. 4A in greater detail in accordance with one embodiment of the present invention.

Destination CAM block 461 is depicted in somewhat greater detail in FIG. 4B. Connection requests are generated by each destination CAM block (e.g., block 461). Connection request 445(0) is generated in the Request (0) column. Connection request 445(n) is generated in the Request (n) column. Connection requests 445(0) and 445(n) are inverted by buffers 447(0) and 447(n), respectively. Comparison enable signals 443(0) and 443(n) are generated by AND gates 449(0) and 449(n), respectively. AND gates 449(0) and 449(n) take a direct input from the enable line of a destination CAM block (e.g., enable line 443, CAM block 441) and an inverted input from a match line of a corresponding priority CAM block (e.g., CAM block 461) and generate the enable signal upon a logical AND match therefrom.

Figure 5A:
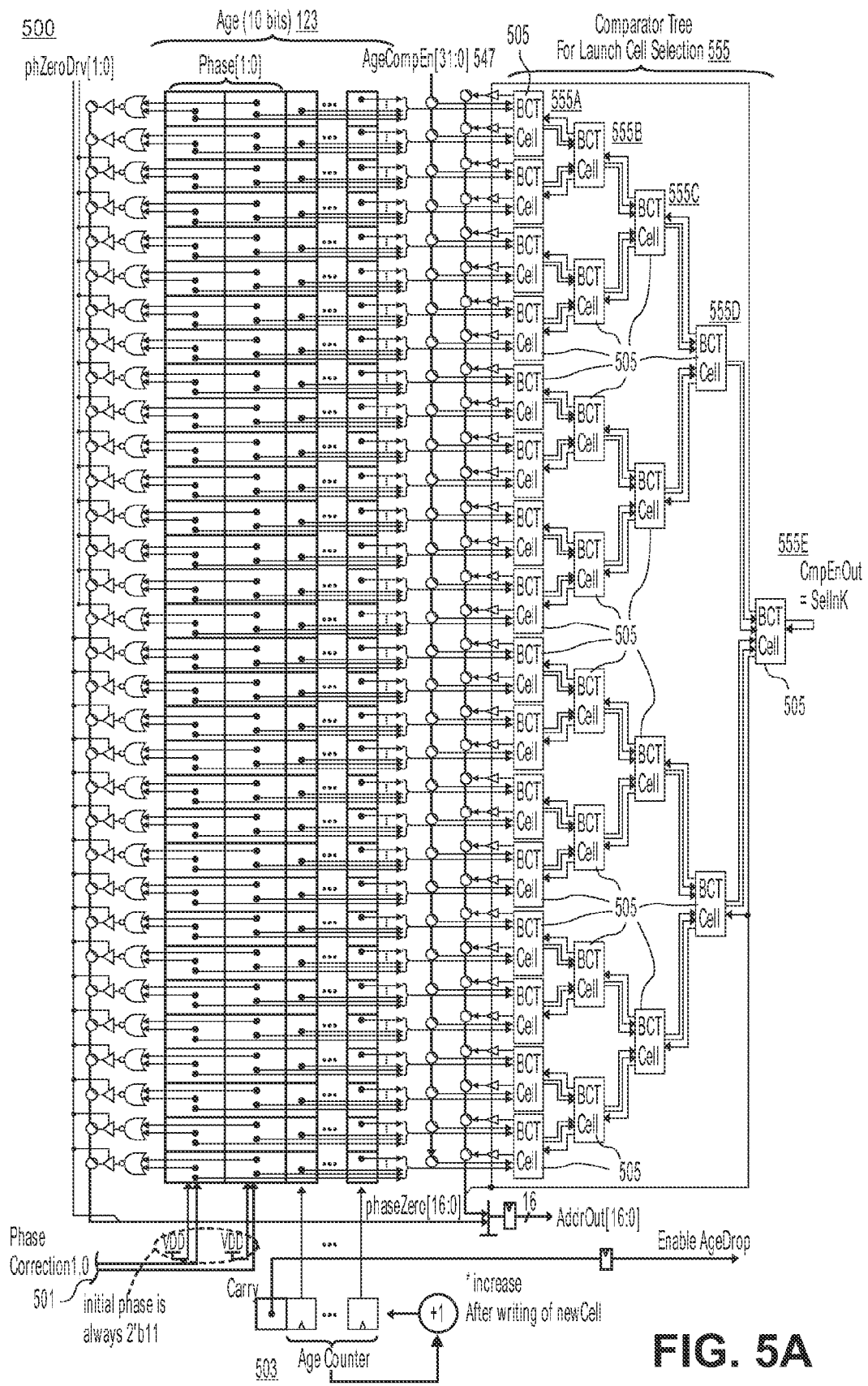
FIG. 5A depicts an ingress side age comparator, according to an embodiment of the present invention.
Figure 5B:
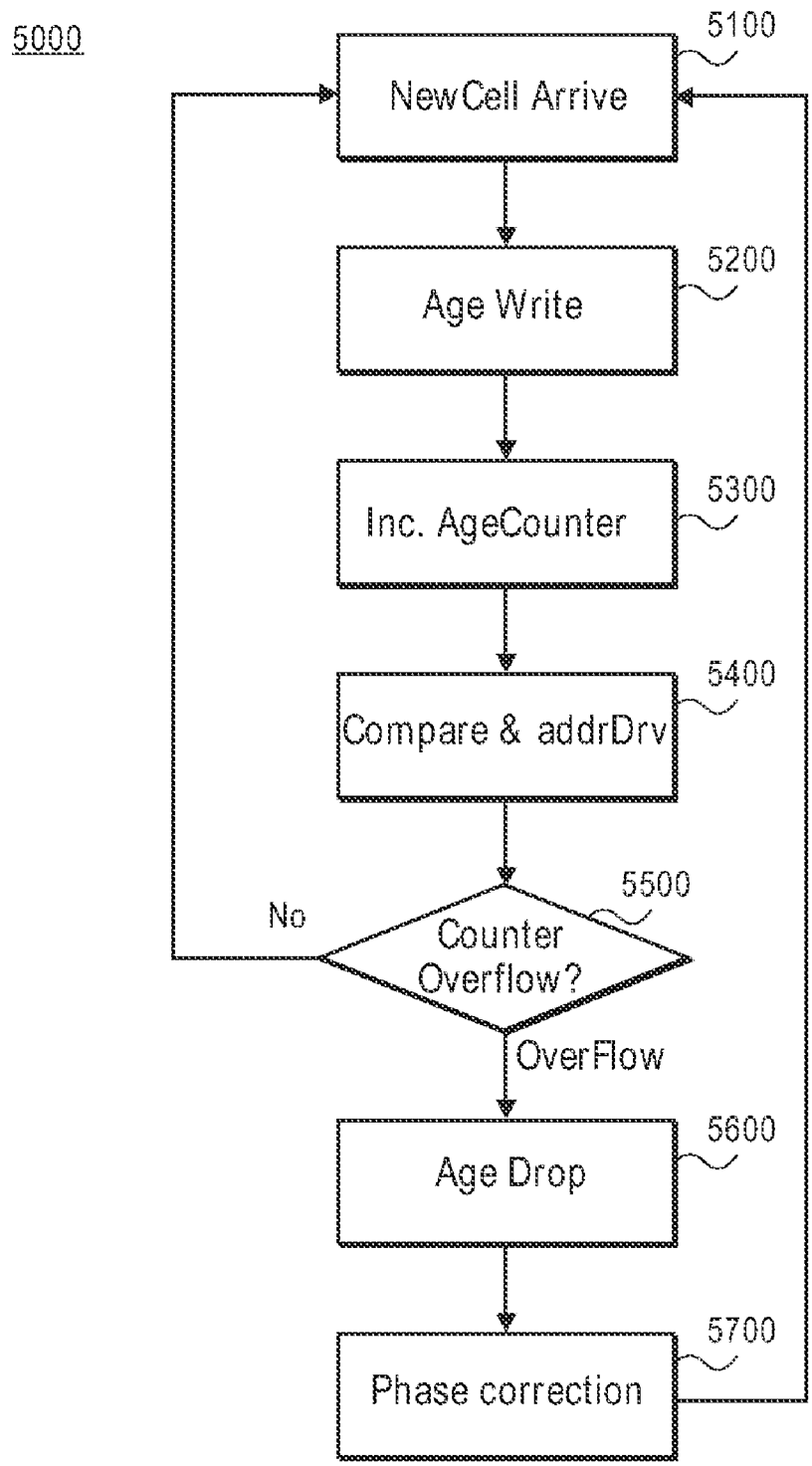
FIG. 5B is a flowchart of the steps in a process for comparing packet ages in an ingress side age comparator, according to an embodiment of the present invention.

With reference to FIG. 5A, an ingress side age comparator 500 is depicted in accordance with an embodiment of the present invention. In one embodiment, ingress age comparator 500 operates by an data cell age comparison process 5000. Process 5000 is described with reference to FIG. 5B. Ingress side age comparator 500 and data cell age comparison process 5000 are discussed together for purposes of clarity and brevity.

Process 5000 begins with step 5100, wherein a new data cell arrives in queue. Age comparator 500 receives new incoming cells on in ports 501.

In step 5200, an age is written for the newly arrived data cell. New incoming data cells have the age value currently set by age counter 503. In one embodiment, the phase value of a new cell is 2'b11.

In step 5300, age counter 503 increases its age count to account for the newly arrived cell. After a new cell arrives, age counter 503 increases the age count by one, upon writing of the new cell. Age counter 503 supplies to each data cell arriving in the ingress queue (e.g., ingress CAM) 123 that cell's corresponding age count, which in one embodiment comprises 10 bits.

For programming packet switching by the crossbar switch, the data cells are scheduled for launching, in one embodiment, by an interleaved age and priority scheme (e.g., interleaved age-priority selection process 1200; FIG. 12). In one embodiment, the age comparison and selection component of this interleaved age/priority scheme considers the age of the various queued packets. Thus in step 5400, the ages of the various queued data cells is compared and the oldest data cell in queue selected.

When the ingress queue 123 fills, the arrival of additional data cells causes an overflow condition. In step 5500, it is determined whether an overflow condition exists in counter 503. If not, process 5000 loops back to step 5100 and continues accordingly.

Upon sensing the overflow, age counter 503 arithmetically carries in the aging summation by adjusting the phase of the data cells already existing in ingress queue 123. This phase correction is performed by supplying new phase information, comprising two additional bits, to the extant cell in queue 123. That cell's actual age is thus read as:

{(2-bit phase value0, (10-bit age value)} such that first written high (e.g., 1), the phase-corrected age is lowered (e.g., driven to zero).

By this age comparison and selection component of the interleaved age/priority scheme, the smaller the age of a cell, the older that cell is, and thus the sooner that particular cell should be serviced for switching. Further, by this scheme, a cell that becomes too old is advantageously eliminated; its data considered stale. Thus, if it is determined in step 5500 that an overflow condition does exist in age counter 503, then process 5000 proceeds to step 5600, wherein the stale aged data cell is dropped.

Then in step 5700, phase correction is effectuated for the data cells extant in queue, whereupon process 5000 loops back to step 5100 and proceeds accordingly. In one embodiment, phase correction modifies the data cells in queue 123 by the following scheme:

0. new cell phase written upon arrival as 2'b11
1. phase [1]<=(phase correction & ~phase [0]) ? 1'b0: phase [1];
2. phase [0]<=phase correction ? ~phase [0]: phase [0];
3. invalidate.

This effectuates a three-step phase correction. The new cell phase is written as 11. Upon initial phase correction, that cell's phase is re-written as 10. Subsequent phase correction re-writes that cell's phase as 00. At this point, if the need arrives for further phase correction, that cell's data is considered stale and the cell is dropped (e.g., invalidated; eliminated), such that another, fresher cell can be selected. For instance, if a valid cell has achieved a phase of 2'b00 (e.g., by phase corrective re-writing), and yet another phase correction is directed, that cell will be invalidated as being too old. In one embodiment, the dropping of the cell is effectuated by driving a phase zero vector 'iPDCam'.

The phase correction order of one embodiment can thus be summarized as:

11→10→00→Invalidate.

In the present embodiment, there is no phase correction step wherein the cell is re-written '01'. By eliminating any such '01' phase re-writing, toggling of the least significant bit (LSB) is prevented. Instead of toggling, the LSB simply goes clear. Advantageously, this effectively reduces the counting circuitry demands imposed by the phase correction process, such that resources are conserved for redirection to other tasking or for elimination.

Figure 6:
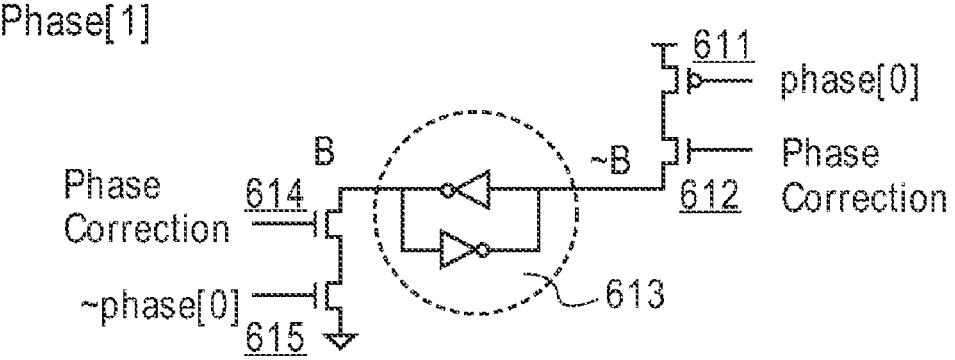
FIG. 6 depicts a phase cell structure that effectuates three step self adjustment, in accordance with one embodiment of the present invention.
Figure 6:
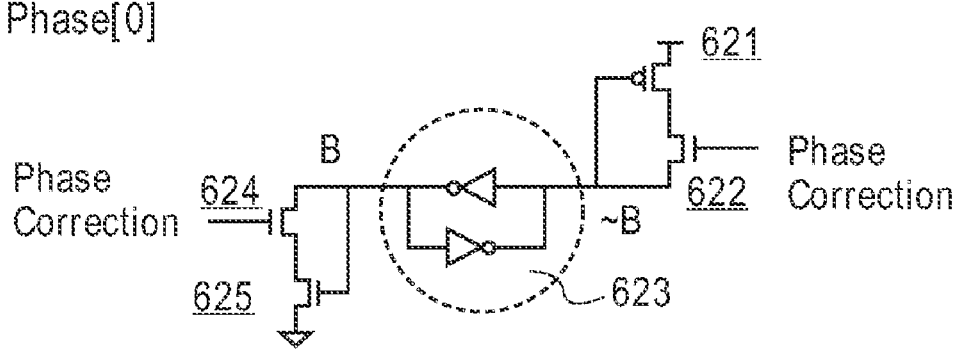

In one embodiment, this three-step phase correction is effectuated by a phase cell structure 600, as depicted in FIG. 6. Phase [1] sub-cell 610 comprises transistors 611 and 612, inverters 613, and transistors 614 and 615. The drain of transistor 611 is at Vdd. Transistor 611 has an inverted 'phase [0]' gate input, and its source is connected in series with the drain of transistor 612. Transistor 612 has a 'phase correction' gate input. The source of transistor 612 is connected in series with a mirrored pair of inverters 613. Inverters 613 then connect in series with the drain of transistor 614. Transistor 614 has a 'phase correction' gate input. The source of transistor 614 is connected in series with the drain of transistor 615. Transistor 615 has a '~phase [0]' gate input, and its source is grounded.

Phase [0] sub-cell 620 comprises transistors 621 and 622, inverters 623, and transistors 624 and 625. The drain of transistor 621 is at Vdd. Transistor 621 has an inverted gate input from the source of transistor 622. The source of transistor 621 is connected in series with the drain of transistor 622. Transistor 622 has a 'phase correction' gate input. The source of transistor 612 gates transistor 621 and is also connected in series with a mirrored pair of inverters 623. Inverters 623 then connect in series with the drain of transistor 624, which also gates transistor 625. Transistor 624 has a 'phase correction' gate input. The source of transistor 624 is connected in series with the drain of transistor 625. Transistor 625 is gated by the drain of transistor 624. The source of transistor 625 is grounded.

Referring again to FIG. 5A, the age comparison and selection component of the interleaved age/priority scheme for data cell launch selection is effectuated, in one embodiment, by a comparator tree 555. In one embodiment, comparator tree 555 comprises five progressive layers 555A through 555E of binary comparator tree (BCT) cells 505. In the present embodiment, each stage of the age stack (e.g., ingress queue) 123 presents one input to the BCT cells 505 comprising the first layer 555A, via age comparison enable stage 547. This effectuates a first stage of ingress side age comparison.

The output of each pair of BCTs 505 comprising layer 555A are compared by a BCT 505 in layer 555B, thus effectuating a second stage of age comparison. The output of each pair of BCTs 505 comprising layer 555B are then compared by a BCT comprising layer 555C, thus effectuating a third stage of age comparison. The output of each pair of BCTs 505 comprising layer 555C are then compared by a BCT comprising layer 555D, thus effectuating a fourth stage of age comparison. Finally, in the present embodiment, the output of each pair of BCTs 505 comprising layer 555D are then compared by a single BCT comprising layer 555D, thus effectuating a fifth stage of ingress side age comparison.

Figure 7:
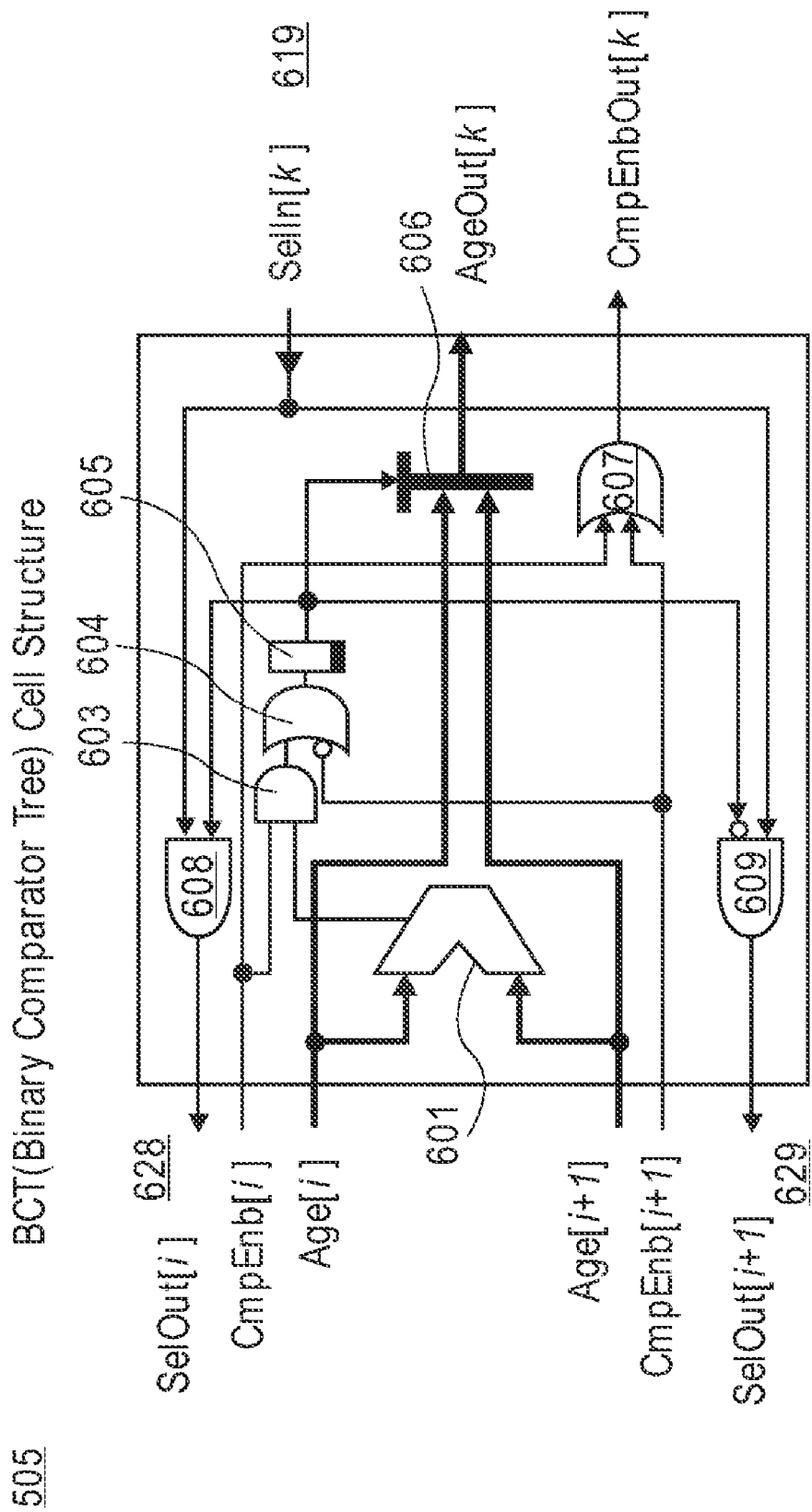
FIG. 7 depicts an ingress side binary comparator tree cell structure, according to an embodiment of the present invention.

The structure of a single BCT 505 cell of one embodiment is depicted in FIG. 7. A comparator 701 subtractively compares age inputs 'j' and 'j+1' to provide the older age to an upper level of age queue 123 (FIG. 5A) via age multiplexer (MUX) 606. Effectively simultaneously, the age comparison result is stored via AND gate 603 and OR gate 604 into an age comparison result latch 605. Upon the return of a select age input signal 619 'Selln[k]' from the upper level of input queue 123, either the output selection 628 'SelOut [j]' or the output selection 'SelOut [j+1]' is activated, based on the result of the comparison previously latched in latch 605. In the event that the select age input signal 619 'Selln[k]' returns not activated, then both of the output selection 628 'SelOut [j]' and the output selection 'SelOut [j+1]' to the lower level of input queue 123 remain in an unactivated condition.

Figure 8A:
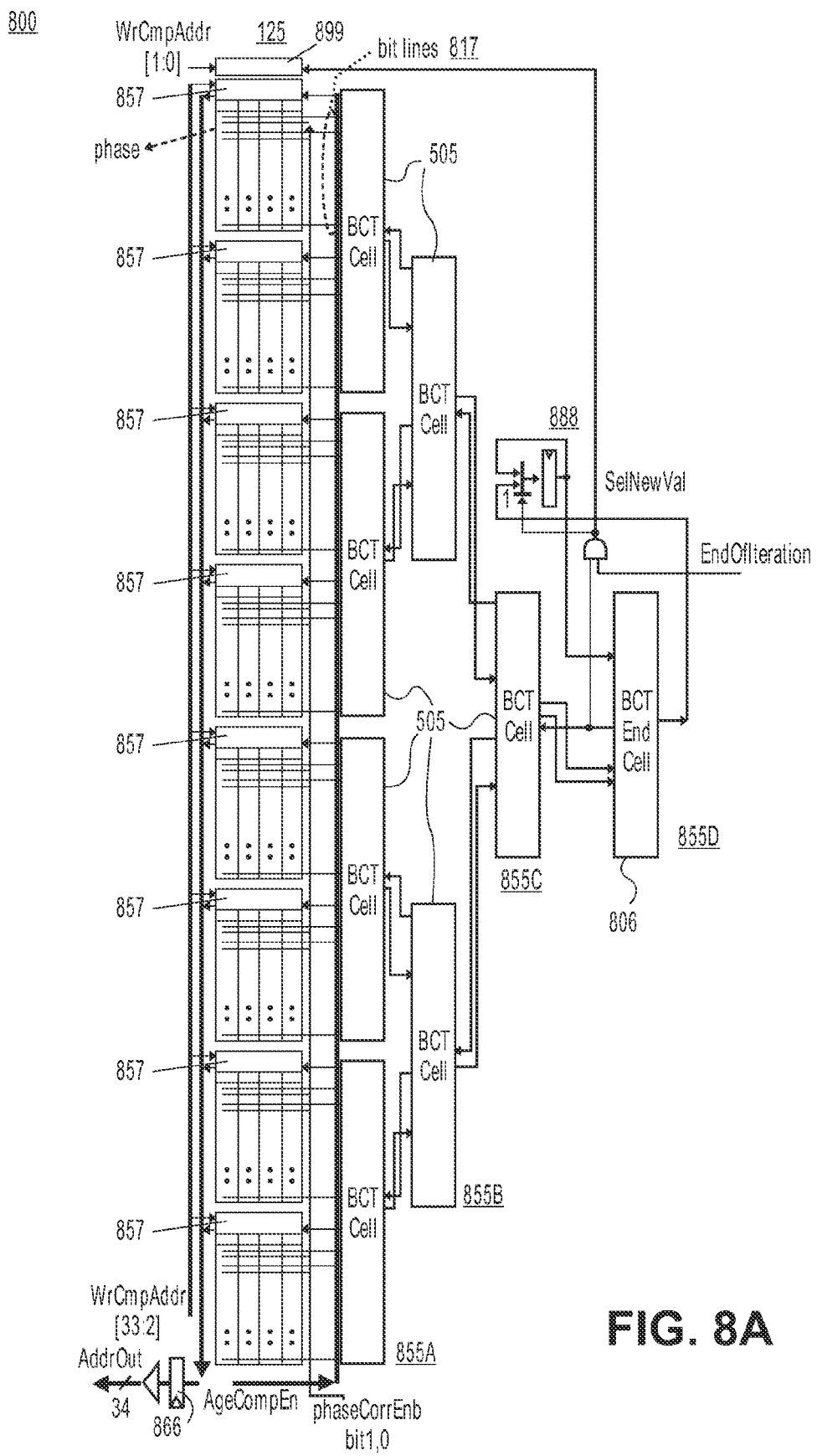
FIG. 8A depicts an egress side age comparator, according to an embodiment of the present invention.

With reference to FIG. 8A, egress cell selection from output queue (e.g., egress CAM) 125 proceeds somewhat similarly. A first stage 855A of BCT cells 505 addresses the contents of output queue 125 via their bit lines 817 to provide a first stage of egress side age comparison. A second stage 855B of egress side age comparison compares the results of the first stage 855A. A third stage 855C of egress side age comparison compares the results of the second stage 855B. The first three stages 855A, 855B, and 855C of egress side age comparison are also provided by BCT cells 505.

Figure 8B:
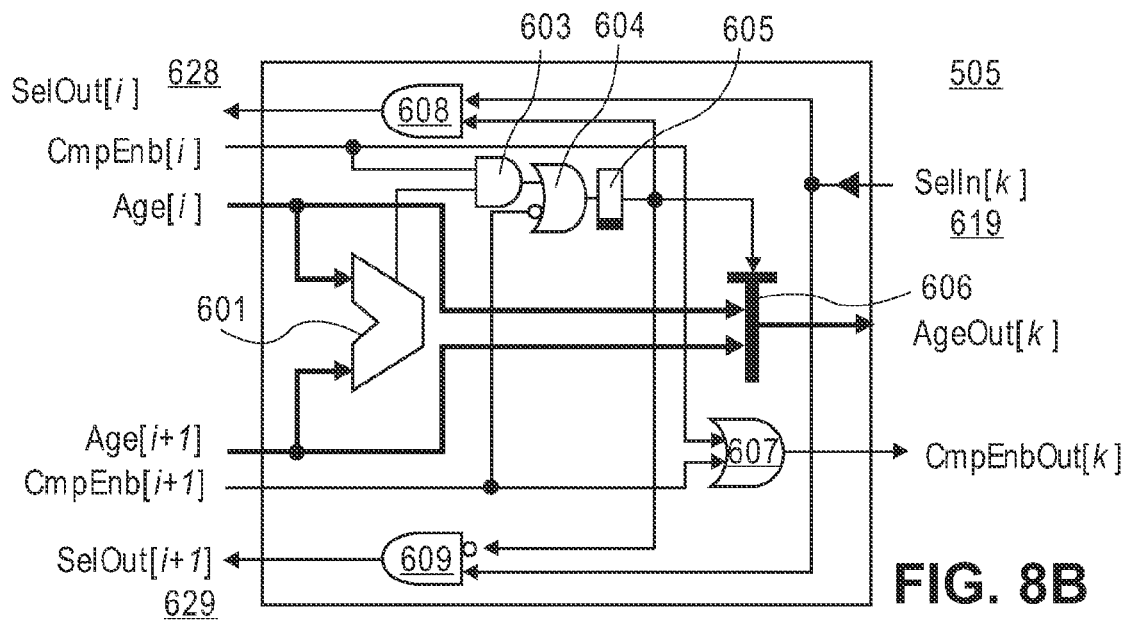
FIG. 8B depicts an egress side binary comparator tree cell structure, according to an embodiment of the present invention.

With reference to FIG. 8B, egress side age comparison is provided in the first three stages 855A, 855B, and 855C by BCT cells 505 in a similar way as ingress side age comparison discussed above. Comparator 601 compares age inputs 'j' and 'j+1' to provide the older age to an upper level of egress CAM 125 via age MUX 606. Effectively simultaneously, the age comparison result is stored via AND gate 603 and OR gate 604 into an age comparison result latch 605. Upon the return of a select age input signal 619 'Selln[k]' from the upper level of egress CAM 125, either the output selection 628 'SelOut [j]' or the output selection 'SelOut [j+1]' is activated, based on the result of the comparison previously latched in latch 605. In the event that the select age input signal 619 'Selln[k]' returns not activated, then both of the output selection 628 'SelOut [j]' and the output selection 'SelOut [j+1]' to the lower level of input queue 123 remain in an unactivated condition.

Figure 8C:
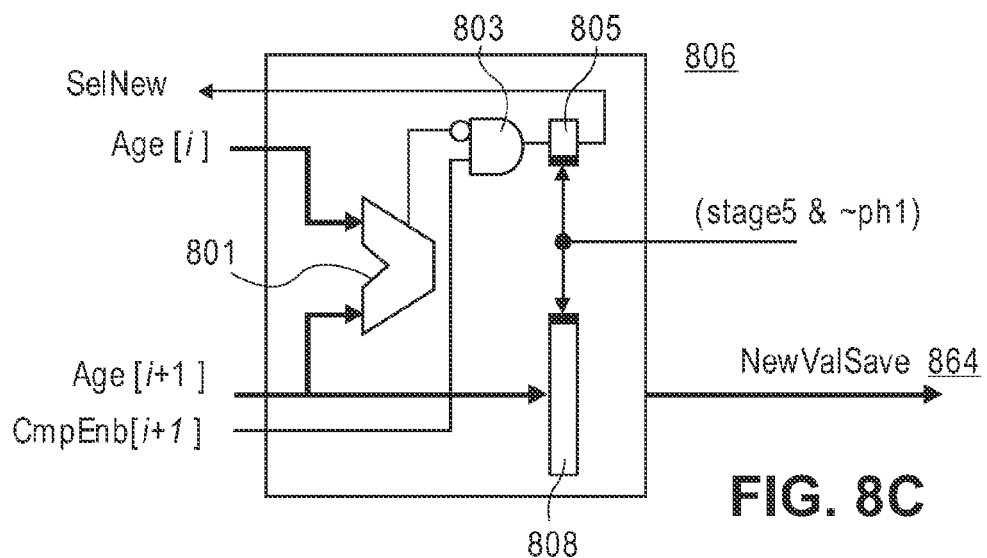
FIG. 8C depicts an egress side binary comparator tree end cell structure, according to an embodiment of the present invention.

The fourth stage 855D of egress side age comparison differs from the previous stages. Referring to FIG. 8C, the fourth stage 855D of egress side age comparison is provided by a single BCT cell 806. Comparator 601 compares age inputs 'j' and 'j+1' to provide the new age value 864 to be saved to a selector 888 (FIG. 8A). Effectively simultaneously, the new age value 864 is registered in latch 808.

Figure 8D:
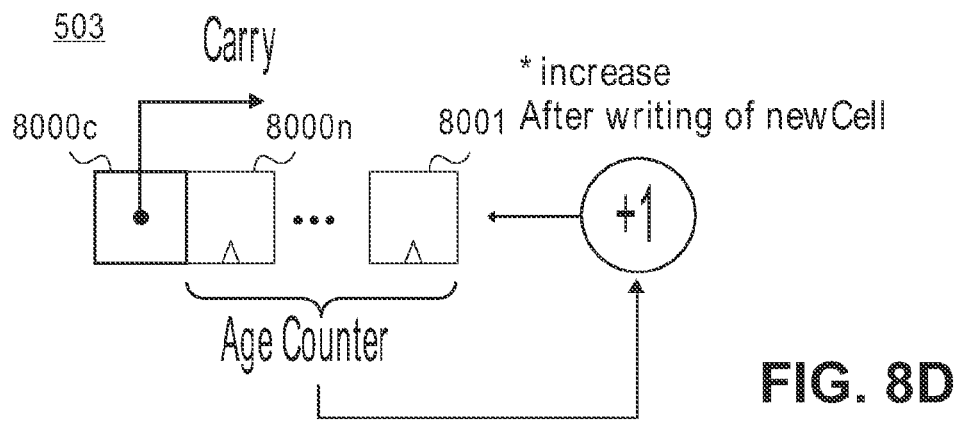
FIG. 8D depicts an age counter, according to an embodiment of the present invention.

As depicted in FIG. 8D, an age counter 503, in one embodiment somewhat similar to the age counter 503 associated with the ingress side age comparator 500, operates as a series of registers 8001 through 8000n, and a carry register 8000c to register overflows. After each new data cell is written to the egress side CAM 125, the age counter 503 increases the age count by one (1).

Referring again to FIG. 8A, addresses within egress CAM 125 whose data cells are to be exported are registered in register 866. Writing to egress CAM 125 is controlled by a block controller 899 and CAM cell block control stages 857. Block controller 899 and CAM cell block control stages 857 are depicted in somewhat greater detail in FIG. 9.

Figure 9:
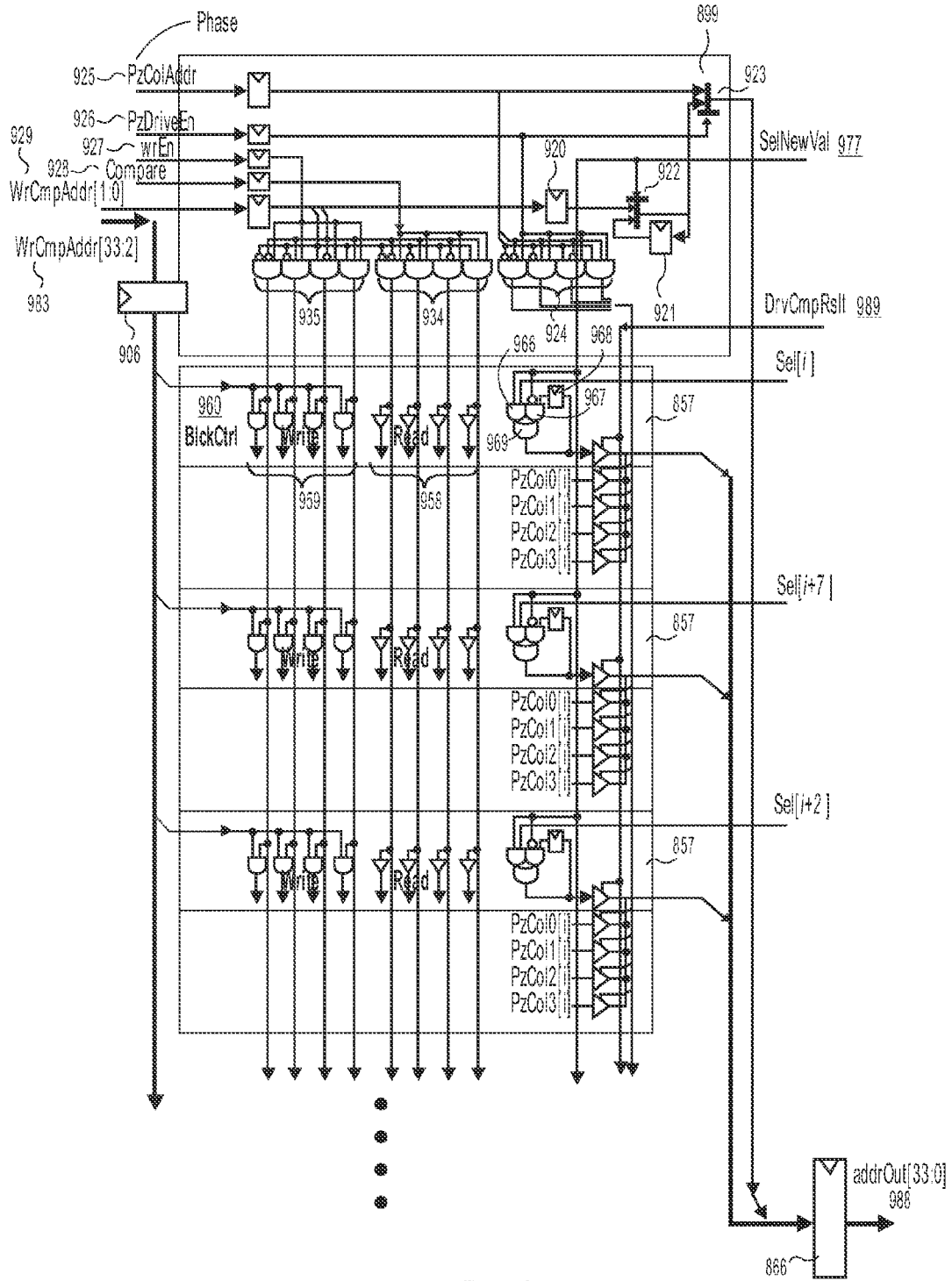
FIG. 9 depicts a block controller, according to an embodiment of the present invention.

With reference to FIG. 9, block controller 899 receives a phase column address signal 'PzColAddr' 925 that is registered by register 915, a phase drive enable signal 'PzDriveEn' 926 that is registered by register 916, a write enable signal 'wrEn' 927 that is registered by register 917, a compare signal 'Compare' that is registered by register 918, and a write compared addresses signal 'WrCmpAddr [1:0]' 929 that is registered by register 919. A write compared addresses signal 'WrCmpAddr[33:2]' 983 is also received and registered by register 906.

'PzColAddr' signal 925 provides an input to AND gates 924 and is multiplexed with the output of MUX 922 by MUX 923 to provide an address out signal 'addrOut[33:0]' 967, which is registered by register 866. MUX 923 is controlled by the 'PzDriveEn' signal 926. MUX 922 is controlled by a select new value signal 'SelNewVal' 977, and multiplexes the 'WrCmpAddr[1:0]' signal 929 with its own registered output, which is registered by register 921.

'Read' signals to stages 857 are promulgated by AND gates 934 in response to inputs comprising the registered 'Compare' signal 928 and the registered 'WrCmpAddr[1:0]' signal 929. The 'Read' signals are distributed within the stages 857 by buffers 958. 'Write signals to stages 857 are promulgated by AND gates 935 in response to inputs comprising the registered 'wrEn' signal 927 and the registered 'WrCmpAddr[1:0]' signal 929.

These promulgated 'Write' signals are distributed within the stages 857 by AND gates 959 to which they provide an input. Another input to AND gates 959 is the registered 'WrCmpAddr[33:2]' signal 983. A block control signal to each stage 857 is provided by AND gate 960, the inputs of which comprise a promulgated 'Write' signal from AND gates 935 and the registered 'WrCmpAddr[33:2]' signal 983. Block control is provided in each stage by block control AND gate 960, the inputs of which comprise the registered 'WrCmpAddr[33:2]' signal 983 and the output of one of AND gates 935 having as its own inputs two inverted registered 'WrCmpAddr[1:0]' signals and a registered 'WrEn' signal 927.

In each stage 857, AND gates 966 receive as inputs a select signal 'Sel[j]' 976, the count of [j] increasing by one for each stage 857 position separation from block controller 899 (e.g., 'Sel[j+1],' 'Sel[j+2],' etc.) and the select new value signal 'SelNewVal' 977. Also in each stage 857, AND gates 967 receive as inputs an inverted 'Sel[j]' 976 signal, and the registered output of OR gate 969, which is registered in register 968. The output of AND gates 966 and 967 provide inputs to OR gate 969. The output of OR gate 969 drives output buffer 970, the output of which comprises an address out signal 'addrOut[33:0]' 988, which is registered by register 866. Also providing 'addrOut[33:0]' signals 988 from each stage 857 are buffers 971, the inputs of which comprise phase signals from each column, 'PzCol0[j]' through 'PzCol3[j].' Buffers 970 and 971 are controlled by a drive comparison result signal 'DrvCmpRslt' 989.

Phasing in the egress stages proceeds according to a three-step phase correction somewhat similar to the ingress side phase correction process described above. The phase of a new cell for export is written as 11. Upon initial phase correction, that cell's phase is re-written as 10. Subsequent phase correction re-writes that cell's phase as 00. At this point, if the need arrives for further phase correction, that cell's data is considered stale and the cell is dropped (e.g., invalidated; eliminated), such that another, fresher cell can be selected. For instance, if a valid cell has achieved a phase of 2'b00 (e.g., by phase corrective re-writing), and yet another phase correction is directed, that cell will be invalidated as being too old. In one embodiment, the dropping of the cell is effectuated by driving a phase zero vector.

The phase correction order of one embodiment can thus also be summarized as:

11→10→00→Invalidate.

In the present embodiment, there is no phase correction step wherein the cell is re-written '01'. By eliminating any such '01' phase re-writing, toggling of the LSB is prevented, as instead of toggling, the LSB simply goes clear. Advantageously, this also effectively reduces the counting circuitry demands imposed by the phase correction process, such that resources are conserved for redirection to other tasking or for elimination.

Figure 10:
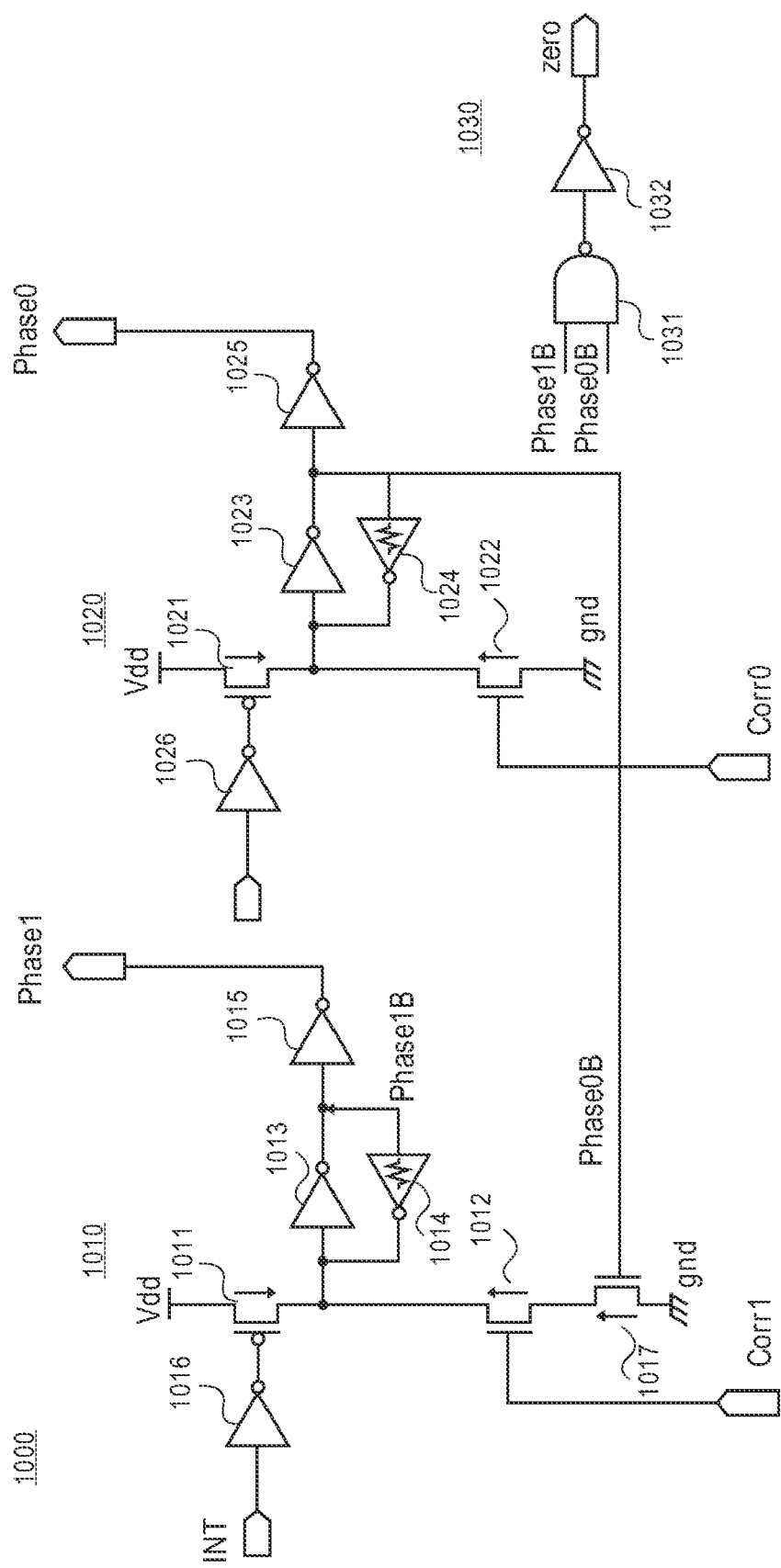
FIG. 10 depicts a phase cell structure for three-step egress side phasing self adjustment, according to an embodiment of the present invention.

With reference to FIG. 10, the phase cell structure 1000 for three-step egress side phasing self adjustment according to one embodiment of the present invention is described. Phase [1] sub-cell 1010 comprises transistors 1011, 1012, and 1017, and buffers 1013, 1014, and 1015. The drain of transistor 1011 is at Vdd. The inverted output of buffer 1016, whose input is an initiate signal 'Init,' gates transistor 1011. The source of transistor 1011 is connected in series with the drain of transistor 1012, which is gated by a correct phase signal 'Corr1.' The source of transistor 1012 is connected in series with the drain of transistor 1017. The source of transistor 1017 is grounded. Transistor 1017 is gated by the pre-buffered 'phase0B' signal from the inverted output of buffer 1023 (e.g., upstream of buffering by buffer 1025).

The source of transistor 1011 drives the input of buffer 1013, whose output is inverted and fed back to the input of buffer 1013 by mirroring amplifier 1014. The inverted output of buffer 1013 is buffered by buffer 1015, the inverted output of which promulgates the phase 1 signal 'phase1.'

Phase [0] sub-cell 1020 comprises transistors 1021 and 1022, and buffers 1026, 1023, 1024, and 1025. The drain of transistor 1021 is at Vdd. Transistor 1021 has an inverted gate input from the inverted output of buffer 1026. The source of transistor 1021 is connected in series with the drain of transistor 1022. Transistor 1022 has a phase 0 correction gate input 'Corr0.' The source of transistor 1022 is grounded.

The source of transistor 1021 drives the input of buffer 1023, whose output is inverted and fed back to the input of buffer 1023 by mirroring amplifier 1024. The inverted output of buffer 1023 is buffered by buffer 1025, the inverted output of which promulgates the phase 0 signal 'phase0.'

In one embodiment, dropping of cells is effectuated by driving a phase zero vector in sub-cell 1030. Phase zero vector sub-cell 1030 comprises a NAND gate 1031 and a inverter 1032. NAND gate 1031 takes one input from the 'Phase1B' signal and a second input from the 'Phase0B' signal, which it inverts. The output of NAND gate 1031 drives inverter 1032. The output of inverter 1032 provides a phase zero vector signal 'Zero.'

Exemplary Interleaved Age-Priority Based Selection

Data cells have different importances, relative to one another. These differences in relative importance characterize a priority by which each data cell should be handled for switching, relative to other data cells. Data cells having higher priority than other cells should be selected for switching earlier than data cells having lower priorities. However, the age of a particular data cell is considered relevant in scheduling switching by an embodiment of the present invention.

The older that a particular data cell is, the sooner that particular data cell should be serviced for switching. A penalty of not switching a particular data cell expeditiously is that its data can become stale. Thus, the embodiments described above effectuate an interleaved age-priority based selection criteria for both packet switching by the crossbar switch, as well as export from the output ports thereof.

In one embodiment, data cells having higher priorities are serviced earlier than data cells having lower priorities by the WRR scheme described above. However, to prevent lower priority cells from being effectively "stuck in queue," e.g., never being switched, the present embodiment takes the age of the data cells into account for scheduling switching as well. In one embodiment, where two cells of equal priority are to be serviced for switching, the older data cell is serviced before the younger data cell. In the present embodiment, the age of a data cell can advantageously serve as a tie-breaker in scheduling its switching, vis-a-vis other data cells of equal priority.

Figure 11:
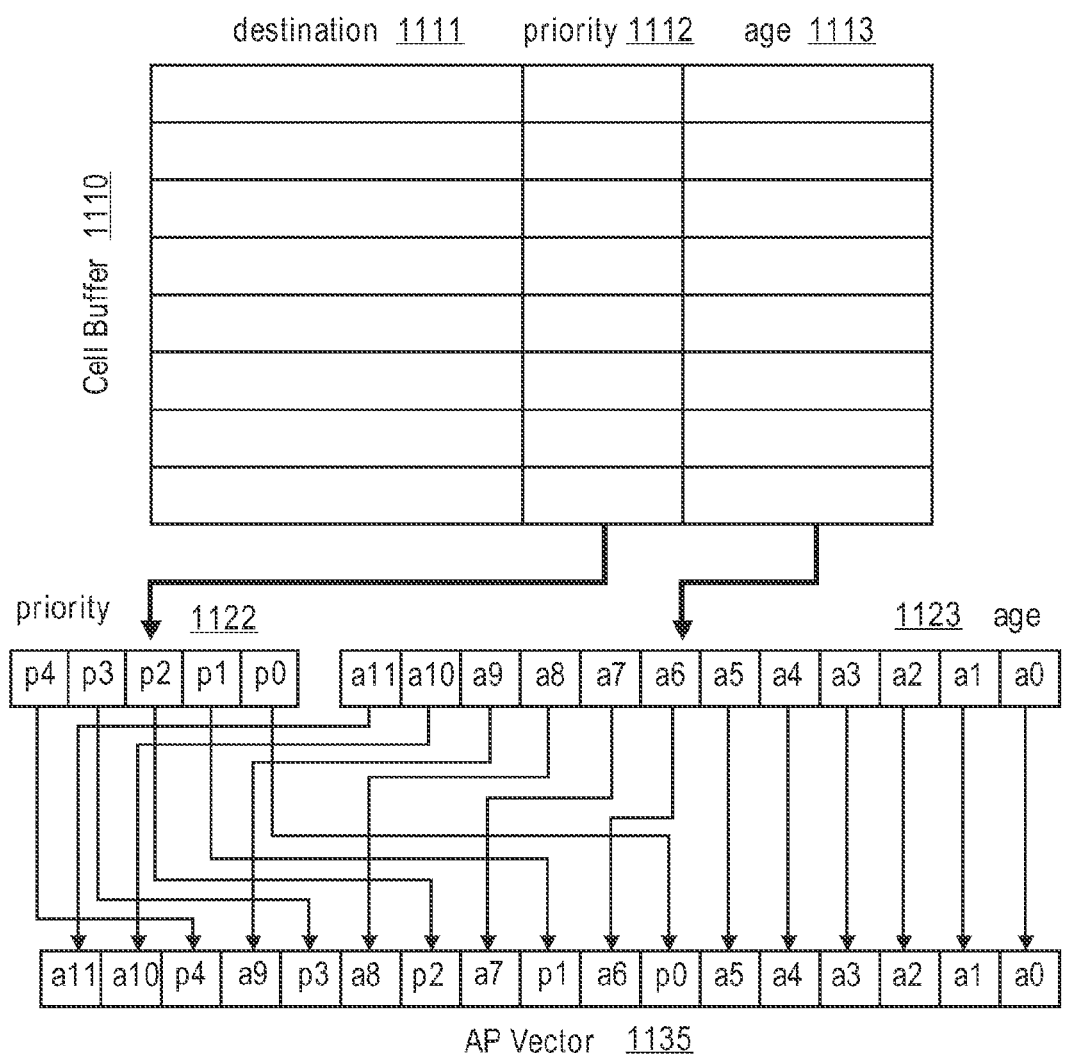
FIG. 11 depicts an interleaved age-priority based selection scheme, according to an embodiment of the present invention.

In one embodiment, an interleaved age-priority based selection process proceeds by an algorithm that takes into account the need to service the aging data cells (of all priorities), as well as high-priority cells. With reference to FIG. 11, an age-priority interleaving selection 1100 is described according to one embodiment of the present invention. With reference to FIG. 12, a process 1200 for interleaving data cell age and data cell priority for switching according to one embodiment is described. It is appreciated that, in another embodiment, steps of process 1200 can be performed in another order. Selection 1100 and the interleaved age-priority selection process 1200 are discussed together for purposes of clarity and brevity.

Referring to FIG. 11, a data cell buffer 1110 is comprised of three columns including a destination column 1111, a priority column 1112, and an age column 1113. Referring to FIG. 12, in step 1201, a data cell is received by buffer 1110. In step 1202, a particular data cell is listed in a single row of cell buffer 1110 by its destination, under destination column 1111. In step 1203, the priority of that particular data cell is then listed in the priority column 1112 space corresponding to that row. In step 1204, the age of that particular cell, which can be changed dynamically as the cell ages, is listed in age column 1113 space corresponding to that row. As data cell buffer 1110 fills with data cells, vectors can be formed corresponding to the priority and age of the data cells therein.

In step 1205, a priority vector 1122 is formed from the entries within priority column 1112 of cell buffer 1110. Priority vector 1122 orders the data cells then residing within data cell buffer 1110 according to their priority. In the present embodiment, data cells of the highest priority are ordered to the head of the priority vector 1122 having the smallest numbers. Thus, from highest priority in decreasing order of priority, priority vector 1122 orders the data cells as follows:

p0, p1, p2, p3, p4.

In step 1206, an age vector 1123 is formed from the entries within age column 1113 of cell buffer 1110. Age vector 1123 orders the data cells then residing within data cell buffer 1110 according to their age. In the present embodiment, the oldest data cells are ordered to the head of the age vector 1123 having the smallest numbers. Thus, from oldest age in decreasing order of age, e.g., to youngest data cell, age vector 1123 orders the data cells as follows:

a0, a1, a2, a3, a4, a5, a6, a7, a8, a9, a10, a11.

Then in step 1207, priority vector 1122 and age vector 1123 together form an age-priority (AP) vector 1135. In one embodiment, any bit order combination can comprise AP vector 1135, depending upon the service requested. Further, in one embodiment, the bit order comprising AP vector 1135 can be changed to provide for changing service requests. The exemplary AP vector 1135 depicted lists data cells in order for servicing based on the desire to service aging cells, as well as to service high priority cells. Thus, the bit order AP vector 1135 arranges, from the data cell first scheduled for service to the last is as follows:

a0, a1, a2, a3, a4, a5, p0, a6, p1, a7, p2, a8, p3, a9, p4, a10, a11.

Thus, six older data cells, a0, a1, a2, a3, a4, and a5, are queued for servicing prior to the data cell having the highest priority, p0. After p0, age and priority are completely interleaved until the last data cell comprising priority vector 1122 (e.g., 'p4') is ordered, after which the remaining data cells a10 and a11, the youngest data cells in cell buffer 1110, are ordered.

In step 1208, it is determined whether the bit order comprising AP vector 1135 is to be changed to provide for changing service requests. If it is determined that the bit order comprising AP vector 1135 is to be changed, then in step 1209 the bit order comprising AP vector 1135 is changed dynamically for subsequent switching ordering, upon which process 1200 loops back to step 1207 and repeats accordingly. If it is determined that the bit order comprising AP vector 1135 is not to be changed, then process 1200 is complete at this point.

Advantageously, in the present embodiment, the bit order can be changed dynamically. This ability to reconfigure the bit order of the AP vector 1135 can effectuate the UWRR selection discussed above, interleaved with age selection to reduce dropping data cells because of excessive age and stale data.

Thus a method and system for system and method for an age selection switching scheme for data traffic is disclosed, which in one embodiment emulates a FIFO switching function in a single chip crossbar switch architecture that operates at a high switching speed with a large bandwidth and supports multiple QoS levels, yet do not demand an inordinately large number of input and output queues or otherwise excessively tax memory requirements. The system and method operate at a high switching speed with a large bandwidth and support multiple QoS levels, yet do not require a complex pointer management system, nor constrain switching speeds and bandwidth capacity therein.

A content addressable merged queue (camQ) architecture for high-speed switch fabric solutions reduces the memory requirement for input and output queues for crossbar switches significantly by the use of special CAM memory cells and age tag comparators, implemented within a single chip. In one embodiment, camQ behaves functionally like VOQ FIFO for each supporting priority. Thus, camQ eliminates HOL blocking. In one embodiment, camQ also embraces a scheduler and crossbar within the chip, supporting TDM traffic and multicast traffic also. In one embodiment, structure is independent of the number of support priorities. In one embodiment, many QoS levels are provided, while remaining cost effective at higher traffic bandwidth limits. Data cell age and priority are interleaved criteria in one embodiment for scheduling servicing of the data cells.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the Claims appended hereto and their equivalents.

What is claimed is:

1. A system for comparing the ages of data cells to be switched comprising:
   a plurality of comparator cells for performing a comparison function, wherein said plurality of comparator cells forms a tree structure;
   an age queue coupled to said plurality of comparator cells, wherein said data cells are stored according to an age count representative of their age; and
   an age counter coupled to said age queue, wherein said age counter writes an age count to said age queue corresponding to an initial age count and increasing said age count by one upon the receipt of a subsequent data cell.

2. The system as recited in claim 1 wherein said age count comprises a phase value and an age value.

3. The system as recited in claim 2 wherein said phase value comprises two (2) bits.

4. The system as recited in claim 2 wherein said age value comprises ten (10) bits.

5. The system as recited in claim 2 further comprising a phasing structure coupled to said age queue.

6. The system as recited in claim 5, wherein said phasing structure generates said phase value; and corrects said phase value to correspond to said increasing.

7. The system as recited in claim 6 wherein said correcting said phase value eliminates one of said data cells from said queue in response to said age becoming excessive.

8. The system as recited in claim 6 wherein said correcting said phase comprises:
   writing an initial said phase value as a '11' binary value;
   upon an initial phase correction, re-writing said phase value as a '10' binary value; and
   upon a subsequent said phase correction, re-writing said phase value as a '00' binary value.

9. The system as recited in claim 1, wherein said tree structure comprises a plurality of stages.

10. The system as recited in claim 9, wherein each stage comprises a respective binary comparator cell.

11. The system as recited in claim 10, wherein each respective binary comparator cell comprises:
   a comparator component for comparing a plurality of said ages of said data cells;
   a latch coupled to said comparator component for latching the greater of said ages; and
   a multiplexer for multiplexing said ages with said greater of said ages.

12. The system as recited in claim 1 wherein said system is integrated within a crossbar switch circuit.

13. The system as recited in claim 12 wherein said system is also an integral sub-system of said crossbar switch circuit.

14. A method for selecting a data cell for switching in a switch circuit comprising:
   receiving a new data cell;
   writing an age value of said new data cell;
   increasing an age count to correspond with said new data cell, wherein the age count has a predetermined relationship to an age count for an immediately preceding data cell;
   comparing age values corresponding to a plurality of data cells;
   determining which data cell of said plurality of data cells has the greatest of said age values of said plurality of data cells; and
   queuing said data cell for switching.

15. The method as recited in claim 14 further comprising:
   determining whether said age count reaches a specified maximum value;
   in response to said age count reaching said specified maximum value, dropping one of said plurality of data cells wherein said one of said plurality of data cells has acquired an age value greater than said one of said specified maximum value; and
   correcting phase values corresponding to each data cell of said plurality of data cells accordingly.

16. The method as recited in claim 14 further comprising:
   interleaving a priority rating of said data cell with said age value; and
   queuing said data cell for switching accordingly.

17. The method as recited in claim 16 wherein said interleaving comprises:
   receiving a plurality of data cells in a cell buffer;
   listing each said data cell of said plurality of data cells in said cell buffer according to their respective destinations;
   listing said priority rating corresponding to each data cell of said plurality of data cells in their corresponding buffer columns;
   listing said age value corresponding to each data cell of said plurality of data cells in their corresponding buffer columns;
   generating a priority vector corresponding to the relative priorities of said plurality of data cells;
   generating an age vector corresponding to the relative priorities of said plurality of data cells; and
   combining said priority vector and said age vector to generate an interleaved age-priority vector.

18. The method as recited in claim 12 wherein said interleaving further comprises:
   determining a bit order comprising said age-priority vector is to be changed to a new bit order;
   ascertaining said new bit order; and
   re-combining said priority vector and said age vector to generate an interleaved age-priority vector accordingly.

19. The method as recited in claim 18 wherein said determining, said ascertaining, and said re-combining are performed dynamically.

20. A crossbar switch for selecting a data cell for switching from among a plurality of data cells and comprising:
   a plurality of comparator cells for comparing age values corresponding to a plurality of data cells and determining which data cell of said plurality of data cells has the greatest of said age values of said plurality of data cells, wherein said plurality of comparator cells forms a tree structure;
   an age queue coupled to said plurality of comparator cells, wherein said data cells are stored according to an age count representative of their age; and
   an age counter coupled to said age queue, wherein said age counter writes an age count to said age queue corresponding to an initial age count and increasing said age count by one upon the receipt of a subsequent data cell.

21. A method comprising:
   receiving a plurality of data cells in a cell buffer;
   listing each data cell in said cell buffer according to respective destinations;
   listing a priority value corresponding to each data cell in corresponding buffer columns;
   listing an age count corresponding to each data cell in corresponding buffer columns;
   generating a priority vector corresponding to the relative priorities of said plurality of data cells;
   generating an age vector corresponding to the relative priorities of said plurality of data cells; and
   combining said priority vector and said age vector to generate an interleaved age-priority vector.

22. The method as recited in claim 21 wherein said method further comprises:
   determining a bit order comprising said age-priority vector is to be changed to a new bit order;
   ascertaining said new bit order; and
   re-combining said priority vector and said age vector to generate an interleaved age-priority vector accordingly.

23. The method as recited in claim 22 wherein said determining, said ascertaining, and said re-combining are performed dynamically.

24. The method as recited in claim 21 wherein said method further comprises:
   determining whether said age count reaches a specified maximum value;
   in response to said age count reaching said specified maximum value, dropping one of said plurality of data cells wherein said one of said plurality of data cells has acquired an age value greater than said one of said specified maximum value; and correcting phase values corresponding to each data cell of said plurality of data cells accordingly.

25. A system for comparing the ages of data cells to be exported comprising:
  a plurality of comparator cells for performing a comparison function, wherein said plurality of comparator cells forms a tree structure;
  an age queue coupled to said plurality of comparator cells, wherein said data cells are stored according to an age count representative of their age; and
  an age counter coupled to said age queue, wherein said age counter writes an age count to said age queue corresponding to an initial age count and increasing said age count by one upon the receipt of a subsequent data cell.

26. The system as recited in claim 25 further comprising a phasing structure coupled to said age queue.

27. The system as recited in claim 26, wherein said phasing structure generates said phase value and corrects said phase value to correspond to said increasing.

28. The system as recited in claim 25 wherein said age queue comprises:
  a plurality of memory cells for storing data cells for export, wherein said memory cells are arranged in a plurality of stages;
  a block controller coupled to said plurality of stages for reading from said memory cells, writing to said memory cells, and controlling the flow of said data cells to and from said stages.

29. The system as recited in claim 25, wherein said tree structure comprises a plurality of stages.

30. The system as recited in claim 29, wherein each said stage comprises a binary comparator cell.

31. The system as recited in claim 30, wherein said binary comparator cell comprises:
  a comparator component for comparing a plurality of said ages of said data cells;
  a latch coupled to said comparator component for latching the greater of said ages; and
  a multiplexer for multiplexing said ages with said greater of said ages.

32. The system as recited in claim 25 wherein said system is integrated within a crossbar switch circuit.

33. The system as recited in claim 32 wherein said system is also an integral sub-system of said crossbar switch circuit.

34. A system for comparing the ages of data cells to be switched comprising:
  a plurality of comparator cells for performing a comparison function, wherein said plurality of comparator cells forms a tree structure;
  an age queue coupled to said plurality of comparator cells, wherein said data cells are stored according to an age count representative of their age; and
  an age counter coupled to said age queue, wherein said age counter writes an age count to said age queue corresponding to an initial age count and increasing said age count by one upon the receipt of a subsequent data cell; and
  a phasing structure coupled to said age queue for generating said phase value and correcting said phase value to correspond to said increasing.

35. The system as recited in claim 34 wherein said correcting said phase value eliminates one of said data cells from said queue upon said age becoming excessive.

36. The system as recited in claim 35 wherein said correcting said phase value comprises:
  writing an initial said phase value as a '11' binary value;
  upon an initial phase correction, re-writing said phase value as a '10' binary value; and
  upon a subsequent said phase correction, re-writing said phase value as a '00' binary value.

37. The system as recited in claim 35 wherein said system is integrated within a crossbar switch circuit.

38. The system as recited in claim 37 wherein said system is also an integral sub-system of said crossbar switch circuit.

39. The system as recited in claim 34 wherein said phasing structure comprises a plurality of stages and wherein said phasing structure renders a plurality of phases.

40. The system as recited in claim 39 wherein said phasing structure further comprises a zero vector driver.

41. The system as recited in claim 40, wherein said zero vector driver comprises:
  an NAND logic gate having a plurality of inputs, wherein each of said plurality of inputs correspond to one of said plurality of phases; and
  an inverter coupled to an output of said NAND gate, wherein an output of said inverter comprises a zero vector signal.

* * * * *